United States Patent
Al Faruque et al.

(10) Patent No.: US 12,530,504 B2
(45) Date of Patent: Jan. 20, 2026

(54) AUTOMATION METHODOLOGY BASED ON GRAPH NEURAL NETWORKS TO MODEL INTEGRATED CIRCUITS AND MITIGATE HARDWARE SECURITY THREATS

(71) Applicant: THE REGENTS OF THE UNIVERSITY OF CALIFORNIA, Oakland, CA (US)

(72) Inventors: Mohammad Abdullah Al Faruque, Irvine, CA (US); Rozhin Yasaei, Irvine, CA (US); Shih-Yuan Yu, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 92 days.

(21) Appl. No.: 18/294,092

(22) PCT Filed: Aug. 16, 2022

(86) PCT No.: PCT/US2022/075007
§ 371 (c)(1),
(2) Date: Jan. 31, 2024

(87) PCT Pub. No.: WO2023/129762
PCT Pub. Date: Jul. 6, 2023

(65) Prior Publication Data
US 2024/0338491 A1    Oct. 10, 2024

Related U.S. Application Data

(60) Provisional application No. 63/233,575, filed on Aug. 16, 2021.

(51) Int. Cl.
*G06F 21/71* (2013.01)
*G06F 21/56* (2013.01)

(52) U.S. Cl.
CPC ............. *G06F 21/71* (2013.01); *G06F 21/56* (2013.01)

(58) Field of Classification Search
None
See application file for complete search history.

(56) References Cited

U.S. PATENT DOCUMENTS

| 10,409,994 B1 * | 9/2019 | Kammler | G06F 30/34 |
| 2016/0098565 A1 * | 4/2016 | Vedula | G06F 21/76 726/24 |

(Continued)

OTHER PUBLICATIONS

Lu et al., GramsDet: Hardware Trojan Detection Based on Recurrent Neural Network, 2019, IEEE, 6 Pages (Year: 2019).*

*Primary Examiner* — Christopher C Harris
(74) *Attorney, Agent, or Firm* — NGUYEN TARBET IP LAW

(57) ABSTRACT

The present invention is directed to an automated methodology based on GNN to model IC and mitigate hardware security threats. The present invention features a system for detecting hardware Trojans and IP piracy in a circuit. The system may be based on a GNN. The system may convert a plurality of base-level files from the circuit into a graph, convert this graph into a vectorized graph embedding through the use of the GNN, and use the vectorized graph embedding to identify and remedy potential hardware Trojans as well as identify potential IP piracy between two different circuits.

20 Claims, 16 Drawing Sheets

(56) References Cited

U.S. PATENT DOCUMENTS

2019/0347417 A1\* 11/2019 Tehranipoor .......... G06F 21/566
2021/0097220 A1\* 4/2021 Bhunia ................... G06N 7/01
2022/0188415 A1\* 6/2022 Mishra .................. G06F 21/556

\* cited by examiner

| Paper (year) | Technique category - Method | Precision | Recall | Time (s) | Automated feature extraction | Golden reference free | Unknown Trojan detection | HT detection scope is limited to |
|---|---|---|---|---|---|---|---|---|
| GNN4TJ | ML - Graph neural network | 92% | 97% | 0.026 | ✓ | ✓ | ✓ | - |
| [24] (2018) | ML - Artificial immune system | 87% | 85% | NA | ✗ | ✓ | ✓ | - |
| [7] (2019) | ML - Gradient boosting algorithm | NA | 100% | 1.5s | ✗ | ✗ | ✓ | - |
| [8] (2017) | ML - Multi-layer neural networks | NA | 90% | NA | ✗ | ✗ | ✓ | - |
| [4] (2017) | ML, GM - Subgraph isomorphism | NA | 100% | 1.15 | ✗ | ✓ | ✗ | HTs in the library |
| [6] (2020) | GM - Graph similarity | NA | NA | NA | ✗ | ✓ | ✗ | - |
| [17] (2017) | GM - Subgraph matching | NA | 100% | 5.02 | ✗ | ✓ | ✗ | HTs in the library |
| [11] (2019) | CA - Socio-network analysis | 98% | 98% | NA | ✗ | ✓ | ✗ | combinational HTs |
| [16] (2017) | FV - Information flow analysis | NA | 100% | 29.85 | ✗ | ✓ | ✗ | - |
| [19] (2016) | FV - Model checking | NA | 100% | 96.13 | ✗ | ✓ | ✗ | HTs that leak data |

FIG. 8A

| Bench-mark | AES | RS232 | PIC | DES | RC5 | Average |
|---|---|---|---|---|---|---|
| Detection time(s) | 0.0268 | 0.0169 | 0.0182 | 0.0222 | 0.0215 | 0.0211 |
| Training time(s) | 220.37 | 251.18 | 274.18 | 261.71 | 284.53 | 258.39 |

FIG. 8B

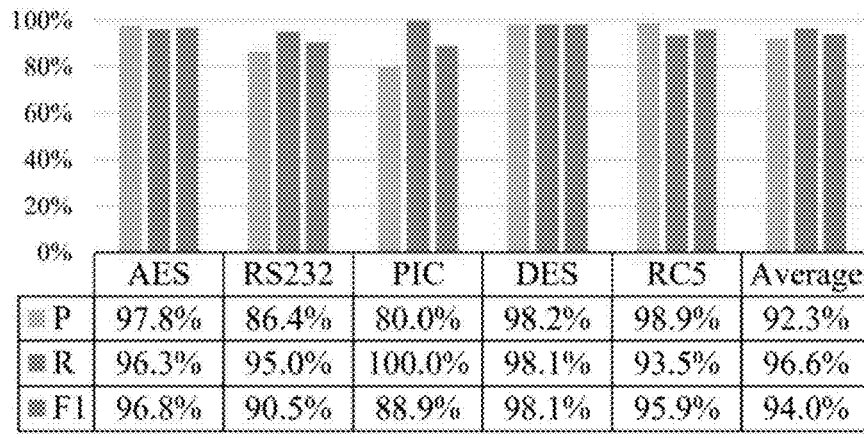

| | AES | RS232 | PIC | DES | RC5 | Average |
|---|---|---|---|---|---|---|
| P | 97.8% | 86.4% | 80.0% | 98.2% | 98.9% | 92.3% |
| R | 96.3% | 95.0% | 100.0% | 98.1% | 93.5% | 96.6% |
| F1 | 96.8% | 90.5% | 88.9% | 98.1% | 95.9% | 94.0% |

FIG. 9

| Benchmark | Trigger Payload | Ours (ML) | [6] (GM) | [17] (GM) | [19] (FV) | [16] (FV) |
|---|---|---|---|---|---|---|
| AES-900 | Time bomb Leak data | ✓✓ | ✓ | ✓✓ | ✓✓ | ✓✓ |
| RS232-T500 | Time bomb Deny service | ✓✓ | ✓ | ✓✓ | ✗ | ✓✓ |
| AES-1900 | Time bomb Degrade chip | ✓✓ | ✓ | ✓✓ | ✗ | ✗ |
| AES-2000 | Cheat code Leak data | ✓✓ | ✗ | ✗ | ✓✓ | ✓✓ |
| RS232-T700 | Cheat Code Deny service | ✓✓ | ✗ | ✗ | ✗ | ✓ |
| AES-1800 | Cheat code Degrade chip | ✓✓ | ✗ | ✗ | ✗ | ✗ |

FIG. 10

Adder 2 Verilog Code
```
Module ADDER (
   input Num1,
   input Num2,
   input Cin,
   output reg Sum,
   output reg Cout;
always @ (Num2, Num2, Cin) begin
   Sum<=((Num1^Num2)^Cin);
   Cout<=((Num1^Num2)&&Cin)||(Num1 && Num2));
end
endmodule
```
Adder2 DFG
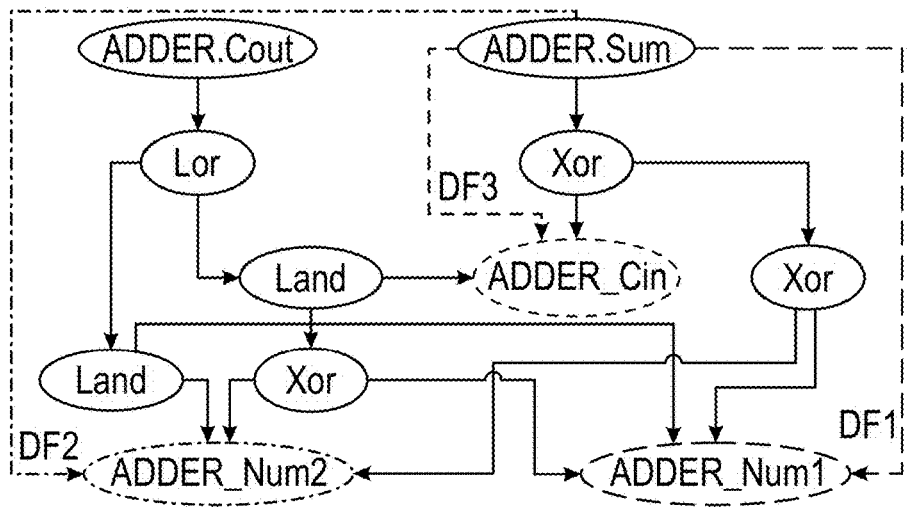
Full Adder Circuit Schematic
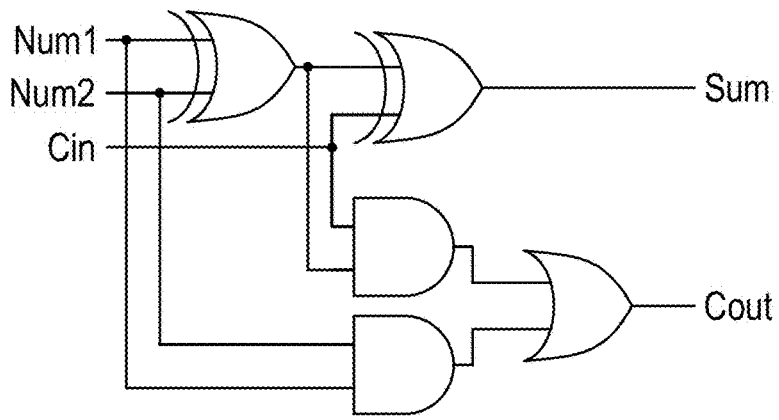
FIG. 11 (Continued)

RTL Dataset

| Predicted Value | Actual Value | |
|---|---|---|
| | Positive | Negative |
| Positive | TP: 3464 | FP: 10 |
| Negative | FN: 190 | TN: 11352 |

Netlist Dataset

| Predicted Value | Actual Value | |
|---|---|---|
| | Positive | Negative |
| Positive | TP: 328 | FP: 0 |
| Negative | FN: 108 | TN: 1567 |

FIG. 14A

| Dataset | Dataset size | # of graphs | Accuracy | Train time per sample | Test time per sample |
|---|---|---|---|---|---|
| RTL | 75855 | 390 | 97.21% | 0.577 ms | 0.566 ms |
| Netlist | 9870 | 143 | 94.61% | 5.999 ms | 5.918 ms |

FIG. 15A

| Case1 | | Case2 | | Case3 | |
|---|---|---|---|---|---|
| Circuits pair | Score | Circuits Pair | Score | Circuits pair | Score |
| AES FPA | -0.2020 | $AES_1$ $AES_1$ | 1 | $P.MIPS_1$ $ALU_1$ | +0.5106 |
| AES RS232 | -0.5240 | $P.MIPS_1$ $P.MIPS_2$ | +0.9939 | $P.MIPS_2$ $ALU_2$ | +0.4965 |
| AES MIPS | -0.0250 | $M.MIPS_1$ $M.MIPS_2$ | +0.8362 | $P.MIPS_3$ $ALU_3$ | +0.4949 |
| FPA MIPS | -0.0887 | $S.MIPS_1$ $S.MIPS_2$ | +0.9982 | $P.MIPS_4$ $ALU_4$ | +0.5460 |
| Mean | -0.0831 | Mean | +0.9571 | Mean | +0.5342 |

FIG. 15B

| Circuit | Circuit Function | # of circuits | Score |
|---|---|---|---|
| c432 | 27-channel interrupt controller | 24 | +0.9998 |
| c499 | 32-bit single error correcting | 23 | +0.9928 |
| c880 | 8-bit ALU | 30 | +0.9996 |
| c1355 | 32-bit single error correcting | 19 | +0.9993 |
| c1908 | 16-bit single/double error detecting | 22 | +0.9999 |
| c6288 | 16 × 16 multiplier | 25 | +0.9945 |
| Between benchmarks and their obfuscated instances | | | +0.9976 |
| Between different benchmarks | | | -0.1606 |

FIG. 15C

AUTOMATION METHODOLOGY BASED ON GRAPH NEURAL NETWORKS TO MODEL INTEGRATED CIRCUITS AND MITIGATE HARDWARE SECURITY THREATS

CROSS-REFERENCES TO RELATED APPLICATIONS

This application claims benefit of U.S. Provisional Application No. 63/233,575 filed Aug. 16, 2021, the specification of which is incorporated herein in its entirety by reference.

STATEMENT REGARDING FEDERALLY SPONSORED RESEARCH OR DEVELOPMENT

This invention was made with government support under Grant No. N00014-17-1-2499 awarded by the Office of Naval Research. The government has certain rights in the invention.

FIELD OF THE INVENTION

The present invention is directed to an automated methodology based on Graph Neural Networks (GNN) to model Integrated Circuits (IC) and mitigate hardware security threats.

BACKGROUND OF THE INVENTION

The IC manufacturing industry has developed significantly and scaled down to 7 nm technology that has made the integration of numerous transistors possible. However, the hardware engineers could not keep up with rapid advancements in the fabrication technology, and they failed to use all of the available transistors in the die. To close this productivity gap under time-to-market pressure, hardware Intellectual Property (IP) core design has grabbed substantial attention from the semiconductor industry and has dramatically reduced design and verification costs.

The globalization of the IC supply chain poses a high risk of theft for design companies that share their most valuable assets, IPs, with other entities. IP piracy is a serious issue in the current economy with a drastic need for an effective detection method. According to the U.S. Department of Commerce study, 38% of the American economy is composed of IP-intensive industries that lose between $225 billion to $600 billion annually because of Chinese companies stealing American IPs mainly in the semiconductor industry, based on the U.S. Trade Representative report.

Hardware IP is considered as any stand-alone component of a system-on-chip design that is classified into three categories based on the level of abstraction: Soft IP (i.e., synthesizable HDL source code), Firm IP (i.e., netlists and placed RTL block), and Hard IP (i.e., GDSII and physical layout).

Conventionally, the IP protection techniques fall into preventive (i.e., logic encryption, camouflaging, metering, and split manufacturing) and detective (i.e., digital signature) methods. All these methods add excessive implementation overhead to the hardware design that limits their applications in practice. Moreover, they mostly focus on security at the IC level, while many commercial IPs comprise the soft IPs due to flexibility, independence of platform technology, portability, and easy integration with other components. The high level of abstraction makes IP protection more challenging since it is easier for an adversary to slightly change the source code and redistribute it illegally at the lower levels of abstraction. Although the existing preventive countermeasures deter IP theft, they cannot guarantee IP security as the adversaries keep developing more sophisticated attacks to bypass them. Therefore, an effective IP piracy detection method is crucial for IP providers to disclose the theft.

To this end, the state-of-the-art piracy detection method is embedding signatures of IP owners known as watermark and legal IP users known as a fingerprint in the circuit design to assure authorship and trace legal/illegal IP usage. IP watermarking and fingerprinting are prone to removal, masking, or forging attacks that attempt to omit the watermark, distort its extraction process, or embed another watermark in IP.

Development and verification of IP can be costly and time-consuming. Therefore, IP providers are concerned about protecting IP from possible threats such as IP piracy (unlicensed usage of IP), overbuilding, counterfeiting (producing a faithful copy of the circuit), and reverse engineering. The countermeasures proposed in the literature can be classified as follows:

Watermarking and fingerprinting: The IP owner and legal IP user's signatures, known as watermark and fingerprint, are added to the circuit to prove infringement.

Hardware metering: The designer assigns a unique tag to each chip, which can be used for chip identification (passive tag) and enabling/disabling the chip (active tag).

Obfuscation: There are two obfuscation methodologies; logic locking (encryption) and IC camouflaging. In the logic locking method, additional gates such as XOR are inserted in non-critical wires. The circuit would be functional only if the correct controlling signal (key) is provided as these gates' input. It is assumed that the correct key is stored in a secure memory, and the attacker does not have access to the key. On the other hand, camouflaging modifies the design such that cells with different functionalities look similar to the attacker and confuses the reverse engineering process.

Split manufacturing: IP house split the design to separate ICs and have them fabricated in different foundries. Thus, none of the foundries have access to the whole design to overbuild, reverse engineer, or perform malicious activities.

The existing defenses suffer from a large overhead on area, power, and timing that restrict their application. As the new countermeasures are developed, the attacks are advanced to bypass them. SAT attack is a powerful method used to formulate and solve a sequence of SAT formulas iteratively to unlock the encrypted circuit, reverse engineer the Boolean functionalities of camouflaged gates, or reconstruct the missing wire in 2.5D split manufactured ICs. Anti-SAT and AND-tree insertion obfuscation techniques are proposed to mitigate SAT attacks. However, signal probability skew (SPS) attack, AppSAT guided removal (AGR) attack, and sensitization guided SAT (SGS) attack break them. A proximity attack is another attack against 2.5D split manufacturing that iteratively connects the inputs to outputs in two IC partitions until a loop is formed. Removal, masking, and forging attacks bypass watermarking by eliminating, distorting, or embedding a ghost watermark.

In this work, a novel methodology for IP piracy detection is proposed that, instead of insertion and extraction of a signature to prove the ownership, models the circuits and assesses the similarity between IP designs. Therefore, the present method does not require additional hardware overhead as the signature and is not vulnerable to removal, masking, or forging attacks. It also effectively exposes the infringement between two IPs when the adversary complicates the original IP to deceive the IP owner. Modeling the hardware design is challenging since it is a structural non-Euclidean data type and most of the modeling techniques are developed for Euclidean data. To solve it, the circuit may be represented as a graph with similar data types and properties and generate the data-flow graph (DFG) of circuits.

As another security threat, IP piracy is a serious issue in the current economy with a drastic need for an effective detection method. According to the U.S. Department of Commerce study, 38% of the American economy is composed of IP-intensive industries [3] that lose between $225 billion to $600 billion annually because of Chinese companies stealing American IPs mainly in the semiconductor industry, based on the U.S. Trade Representative report.

The time to market pressure and resource constraints has pushed SoC designers toward using third-party Electronic Design Automation (EDA) tools and IP cores and outsourcing design, fabrication, and test services worldwide. The globalization of the semiconductor industry has raised the risk of insertion of hardware Trojans by rogue entities in the IC supply chain, refer to FIG. 5. Consequently, HT detection has become one of the major hardware security concerns. HT refers to any intentional and malicious modification of an IC that is usually designed to leak information, change the functionality, degrade the performance, or deny the service of the chip. For example, in 2008, a suspected nuclear installation in Syria was bombed by Israeli jets because Syrian radar was disabled by a backdoor in its commercial off-the-shelf microprocessors.

To ensure the trustworthiness of SoC design, it is essential to ascertain the authenticity of 3PIPs. Depending on the format of the IP, it is classified into three categories; Soft IP (i.e., synthesizable Verilog or VHDL source codes), Firm IP (i.e., netlists and placed RTL blocks), and Hard IP (i.e., GDSII files and custom physical layout). IP trust mainly revolves around HT detection in soft IP cores since it is the most flexible and widely-used IP core in practice. Additionally, the high level of abstraction and flexibility in RTL codes ease the design and implementation of various malicious functions for attackers.

It is crucial to identify HT in the early stages of design flow because removing it would be very expensive later. Detecting a few lines of HT in an industrial-strength IP with thousand lines of RTL code is extremely challenging and any work which requires manual review is error-prone, time-consuming, and not scalable. The need for a scalable pre-silicon security verification method is highlighted in many technical documents, such as a recent white paper from Cadence and Tortuga Logic because existing solutions fail to guarantee the trustworthiness of the hardware design.

Despite numerous HT detection methods proposed in the literature, the problem still exists because as the designers develop a new defense mechanism against the existing HTs, the attackers design new HTs to evade detection. For instance, the FANCI was successful in HT detection until DeTrust designed a new HT to bypass it. Among Trusthub benchmarks, it marks AES-T600 as HT but fails for AES-700 while both HTs have the same trigger and leak the secret key differently. Later, identify the HT in AES-600 and AES-700 by data leakage detection. Nevertheless, it fails for AES-500 degrades the chip instead of data leakage. A recent paper demonstrated that modeling the hardware design as a graph can be beneficial in the hardware security domain. However, graph similarity algorithms limit the detection scope to known HTs in the method's library. The story goes on, and there is no universal method for detecting all types of HTs. Thus, a new scalable methodology is required for unknown HT detection that is expandable as new HTs are introduced.

The existing HT detection solutions have several shortcomings; reliance on golden reference, unable to identify unknown HTs, burdening the designer with a manual review of code, unable to guarantee HT detection, limited detection scope to some specific type of HTs, not scalable, or too complex. To overcome these limitations, a novel golden reference-free pre-silicon HT detection method that learns the circuit behavior and identifies the HTs due to their malicious behavior is presented. Since hardware is a non-euclidean, structural type of data in nature, the graph data structure is used as a great match for hardware representation and generates the DFG for RTL codes. The GNN is leveraged to model the behavior of the circuit. The scalability of the present method lies in the fully automated process of graph generation, feature extraction, and detection without any manual workload. Automatic feature extraction is crucial when new HTs are identified. In this case, the present model can be readily updated without any need for defining new properties or feature engineering as in previous works. The majority of the pre-silicon HT detection techniques in prior literature fall into four main categories, described below:

1) Test Pattern Generation: Due to its stealthy nature, HT remains inactive and well-hidden during the simulation and testing. It gets activated by a particular event under rare circumstances. Automatic test pattern generation methods attempt to generate effective test vectors to increase the probability of triggering the HT. Still, there is no guarantee of their success because it is infeasible to test all the possible conditions.

2) Formal Verification (FV): It is an algorithmic method that converts the 3PIP to a proof checking format and checks if the IP satisfies some predefined security properties, identifies the design bugs using formal verification but cannot detect HT. This method is also employed to detect information leakage and malicious modification to registers. Although formal verification proves the predefined security properties in IP, its detection scope is limited to certain types of HTs because the properties are not comprehensive enough to cover all the different kinds of malicious behaviors that HTs may have. For example, defines the security property as "no-critical-data-corruption" which only detects data-corrupting HTs. Some works employ model checking, such as which is not scalable to large designs because the model checking is NP complex and suffers from state explosion. Information flow tracking is also utilized for modeling the security properties.

3) Code Analysis (CA): The code coverage techniques analyze the RTL code using metrics such as line, statement, finite state machine, and toggle coverage to ascertain the suspicious signals that imitate the HT. These coverage metrics respectively check which lines and statements are executed, which states in the finite state machine are reached, or if signals are switched. This approach burdens the designer with manual analysis of the suspicious regions to identify the possible HT. This analysis is limited to the design's combinational logic, and even 100% coverage does not guarantee that IP is HT-free. FANCI flags the nets with low activation probability as suspicious. VeriTrust returns the nets that are not driven by functional inputs as potential triggers for an HT. DeTrust, on the other hand, proposes an attack that exploits the vulnerabilities of FANCI and VeriTrust and bypasses them.

4) Machine Learning (ML) and Graph Matching (GM): The graph is an intuitive representation of a hardware design that is recently used for security purposes, Prior systems propose analyzing the data/control flow graph of the circuit to pinpoint the HTs. The authors create a library of HTs and search for the graph of those known HTs graphs in the graph of 3PIP using sub-graph matching algorithms. Graph matching is an NP-complex problem that does not apply to large designs. Prior systems introduced a new graph similarity heuristic customized for hardware security to improve accuracy and computation time. These approaches can detect only the HTs with the same graph representation as known HTs in their library, while in practice, attackers design a variety of HTs. Machine learning is a powerful technique that recently has grabbed a lot of attention. Most of the ML-based works for HT detection rely on the side-channel signals which postpone the detection until fabrication. Recently, some approaches use ML techniques instead of graph matching to classify the HT-free and HT-infested IPs by extracting features from the graph representation of the circuit. For example, gradient boosting algorithm on Abstract Syntax Tree, multilayer neural network on gate-level netlist, artificial immune system on DFG and Control Flow Graph (CFG), probabilistic neural network on CFG. Most of these models rely on an HT-free reference called the golden reference. However, a trusted reference is not available because the IP vendors only provide the source code and specifications that may contain HTs. Moreover, reference-based methods may be inconclusive or too complex for exhaustive verification, especially for large designs. The present invention proposes a scalable, golden reference-free model for unknown HT detection and IP piracy detection that leverages a potent ML technique, GNN, to learn the circuit's behavior.

BRIEF SUMMARY OF THE INVENTION

It is an objective of the present invention to provide systems and methods that allow for GNN to model ICs and mitigate hardware security threats, as specified in the independent claims. Embodiments of the invention are given in the dependent claims. Embodiments of the present invention can be freely combined with each other if they are not mutually exclusive.

The present invention features a system for detecting hardware Trojans and IP piracy in a circuit. The circuit may comprise a plurality of signals which may comprise input signals and output signals. The system may be based on a GNN. The GNN may comprise one or more graph convolutional neural network (GCN) layers, one or more pooling layers, and one or more multilayer perceptron (MLP) layers. The system may comprise a Hardware-to-Graph module comprising instructions for reading a plurality of base-level files from the circuit, converting them into a combined file, converting the combined file into a plurality of graphs (one for each signal), and combining the plurality of graphs into a combined graph. The system may further comprise a Graph-to-Vector module. The Graph-to-Vector module may comprise instructions for accepting the combined graph and running the combined graph through the GNN to transform the combined graph into a vectorized graph embedding through a plurality of graph convolutional neural network layers, a pooling layer, and a multilayer perceptron network. This results in a vectorized graph embedding having two two-dimensional outputs.

The system may further comprise a Hardware Trojan Detection module. The Hardware Trojan Detection module may comprise instructions for accepting the combined graph and the vectorized graph embedding from the Graph-to-Vector module and generating a label that determines whether or not there is an HT in the circuit. The Hardware Trojan Localization module may further localize the Trojan circuit in the victim main design by generating node embeddings using GNN and classify the graph nodes based on the vectorized node embeddings between two classes; benign node or HT infected node. In some embodiments, the Hardware Patching module may further comprise instructions for removing the plurality of HT infected nodes from the combined graph of hardware design and recreating the plurality of hardware design files based on the combined graph with HT removed. The system may further comprise an IP Piracy Detection module. In some embodiments, the IP Piracy Detection module may comprise instructions for accepting two vectorized graph embeddings and calculating, based on the GNN, a similarity score between the two. The IP Piracy Detection module may further comprise instructions for determining, based on the similarity score, whether the second vectorized graph embedding contains IP piracy of the first vectorized graph embedding.

This project proposes a novel design automation methodology and associated toolchain to model IC and learn its behavior to mitigate security threats. An overview of the present invention is shown in FIG. 3. A HW2VEC tool may be implemented, in which the hardware design may be represented as its intrinsic non-Euclidian data structure, a graph. A graph learning model based on graph convolutional neural networks may then be applied to the graph representation of hardware to learn its behavior and may generate a vectorized embedding for that hardware design. The hardware graph embedding is key to solving many current IC security problems because it provides a Euclidean representation for hardware, including the design's key features. The present invention may utilize the embeddings to develop several related tools as security defense mechanisms.

The first defense mechanism may be a toolchain to mitigate the security threat of hardware Trojans. The tool may determine if the hardware design is infested with HT according to the Trojan's malicious behavior. After detection, it may be able to localize the HT in the graph representation of the design by tracing back the detection process. Lastly, the hardware patching tool may be proposed to remove the Trojan sub-graph from the circuit graph and generate a Trojan-free circuit. The pipeline may be fully automated as the tool may learn the key features and circuits' behavior automatically without any manual workload for feature engineering or property definition. Furthermore, the tool may be scalable to large designs, and its HT detection scope will not be limited to any specific HT type or only known HTs.

The second security threat to detect may be IP piracy. In this regard, a reverse engineering tool may be used to retrieve information from low-level design. It is used along with another tool to detect IP piracy by comparing the embeddings of two designs. The piracy detection tool may be automated and does not add any circuit overhead to the design. The reverse engineering tool may also be resilient to attacks against digital signature-based piracy detection techniques.

The present invention looks into two major security concerns in the hardware domain; Hardware Trojan, and IP Security. Aggressive time-to-market constraints and enormous IC design and fabrication costs have pushed system-on-chip designers toward using third-party Electronic Design Automation (EDA) tools and IP cores and also outsourcing design, fabrication, and test services worldwide. The globalization of the semiconductor industry has raised the risk of insertion of hardware Trojans by rogue entities in the IC supply chain exposing IP providers to theft and illegal redistribution of IPs, refer to FIG. 4.

HT refers to any intentional and malicious modification of an IC that is usually designed to leak information, change the functionality, degrade the performance, or deny the service of the chip. Due to the devastating effects and stealthy nature of HT, its detection has become one of the major hardware security concerns. The need for a scalable pre-silicon security verification method is highlighted in many technical documents, such as a recent white paper from Cadence and Tortuga Logic because existing solutions fail to guarantee the trustworthiness of the hardware design.

The present invention is advantageous in three aspects. Firstly, a methodology based on GNNs is implemented that automatically learns the behavior of circuits and models the hardware design. Secondly, a defense mechanism for hardware Trojans is implemented that proposes the following advantages over current HT detection methods: the ability to find unknown HTs, automated, fast, scalable, and practical (no reliance on a trusted reference design). It also implements the important feature of localization of Trojan and removing it (hardware patching). Thirdly, a tool for reverse engineering and TIP piracy detection is implemented. The piracy detection methodology is fundamentally prone to the existing attack against state-of-the-art methods (watermarking and fingerprinting) and does not add any hardware overhead to the design.

One of the unique and inventive technical features of the present invention is the implementation of a GNN to create a vectorized graph embedding for a circuit. Without wishing to limit the invention to any theory or mechanism, it is believed that the technical feature of the present invention advantageously provides for the efficient identification of hardware Trojans in a circuit, including unknown Trojans with no previous references, as well as allowing the present invention to efficiently remove the Trojans and rebuild the hardware tree. Furthermore, this methodology addresses the weaknesses of current IP piracy detection methods (watermarking, fingerprinting, etc.) without adding any hardware overhead. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 8A shows a table comparing the performance of the present Trojan detection methodology with the state-of-the-art methods for pre-silicon HT detection.

FIG. 8B shows a table showing the timing of HT detection per sample and training.

FIG. 9 shows a graph and table of the performance of the present Trojan detection methodology in HT detection.

FIG. 10 shows a table comparing the present Trojan detection methodology with the state-of-the-art HT detection methods in a case study.

FIG. 14A shows confusion matrices for IP piracy detection.

FIG. 15A shows a table of performance of the IP piracy detection of the present invention.

FIG. 15B shows a table of the similarity scores for a variety of tested hardware design pairs by the present IP piracy detection methodology.

FIG. 15C shows a table of the similarity scores for obfuscated ISCAS85 benchmarks.

DETAILED DESCRIPTION OF THE INVENTION

Figure 1:
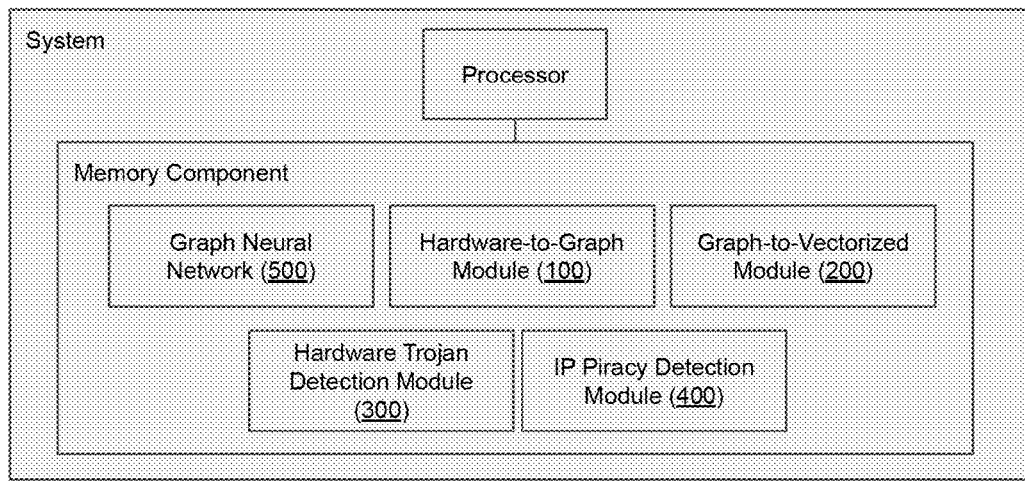
FIG. 1 shows a schematic of a system for HT and IP piracy detection of the present invention.

Following is a list of elements corresponding to a particular element referred to herein:
  100 Hardware-to-Graph module
  200 Graph-to-Vector module
  300 Hardware Trojan Detection module
  400 IP Piracy Detection module
  500 GNN Referring now to FIG. 1, the present invention features a system for detecting hardware Trojans and IP piracy in a circuit. The circuit may comprise a plurality of signals which may comprise input signals and output signals. The system may be based on a GNN. In some embodiments, the system may comprise a processor capable of executing computer-readable instructions, and a memory component. The memory component may comprise the GNN (500). The GNN (500) may comprise one or more graph convolutional neural network (GCN) layers, one or more pooling layers, and one or more multilayer perceptron (MLP) layers. The GNN (500) may be trained by a training set of hardware Trojan infected circuits and similar hardware designs mapped to embedding vectors close. The memory component may further comprise a Hardware-to-Graph module (100). The Hardware-to-Graph module (100) may comprise computer-readable instructions for execution by the processor comprising reading code from a plurality of base-level files from the hardware, preprocessing the code from the plurality of base-level files into a combined base-level file, and parsing the combined base-level file into a plurality of graphs. In some embodiments, parsing the combined base level file into a plurality of graphs may comprise parsing the combined base level file into an abstract syntax tree (AST) and generating the plurality of graphs from the AST. Each graph of the plurality of graphs may represent a signal from the plurality of signals such that the signal may be a root node of the graph. The Hardware-to-Graph module (100) may further comprise instructions for combining the plurality of graphs into a combined graph. The combined graph may connect the output signals of the circuit to the input signals of the circuit with a root-to-leaf relationship. The Hardware-to-Graph module (100) may further comprise instructions for identifying any disconnected subgraphs and any redundant nodes in the combined graph and trimming the disconnected subgraphs and the redundant nodes from the combined graph.

The memory component may further comprise a Graph-to-Vector module (200). The Graph-to-Vector module (200) may comprise computer-readable instructions for execution by the processor accepting the combined graph from the Hardware-to-Graph module (100) and applying the GNN (500) to the combined graph. In some embodiments, applying the GNN (500) may comprise extracting, for each node of the combined graph, an aggregated feature vector. The aggregated feature vector may comprise a plurality of features collected from any neighboring nodes of the node. Applying the GNN (500) may further comprise combining, for each node, a node feature vector of the node with the aggregated feature vector of the node to generate a node feature vector of any incoming neighbor nodes of the node and calculating a weight for each node based on the GNN (500). Extracting the aggregated feature vector for each GCN layer, combining nodes, and assigning weights may be repeated for each layer of the GNN (500). Each repetition may generate a node feature vector for each node, wherein the last repetition results in an embedded node and a final weight for each node. Applying the GNN (500) may further comprise processing the plurality of embedded nodes through the pooling layers of the GNN (500) resulting in a pooled set of embedded nodes, generating a vectorized graph embedding by combining, each embedded node of the pooled set of embedded nodes, all node feature vectors, and processing the vectorized graph embedding through the multilayer perceptron layers of the GNN (500) to reduce an overall output of the Graph-to-Vector Module (200) to a first output and a second output. In some embodiments, processing the plurality of embedded nodes through the pooling layers of the GNN (500) may comprise top-k filtering. The pooling layers may implement a pooling ratio of about 0.8 to aid the top-k filtering. In some embodiments, the Graph-To-Vector Module (200) may comprise the GNN (500).

The memory component may further comprise a Hardware Trojan Detection module (300). The Hardware Trojan Detection module (300) may comprise computer-readable instructions for execution by the processor comprising accepting the combined graph and the vectorized graph embedding from the Graph-to-Vector module (200) and generating, based on the GNN (500), the first output of the vectorized graph embedding which may comprise a first two-dimensional value. The first two-dimensional value may comprise a probability of an HT in the circuit and a probability of no HT in the circuit. The Hardware Trojan Detection module (300) may further comprise instructions for normalizing the first output and determining if the first output has returned a greater probability of an HT, based on the plurality of final weights, a plurality of HT infected nodes. In some embodiments, the Hardware Trojan Detection module (300) may further comprise instructions for removing the plurality of HT infected nodes from the combined graph and recreating the plurality of base-level files based on the combined graph with HT removed.

The memory component may further comprise an IP Piracy Detection module (400). In some embodiments, the IP Piracy Detection module (400) may comprise computer-readable instructions for execution by the processor comprising accepting a first vectorized graph embedding from the Graph-to-Vector module (200), accepting a second vectorized graph embedding from the Graph-to-Vector module (200), and calculating, based on the GNN (500), the second output. The second output may comprise a similarity score of the first vectorized graph embedding and the second vectorized graph embedding. The IP Piracy Detection module (400) may further comprise instructions for determining, based on the similarity score, whether a second circuit corresponding to the second vectorized graph embedding has stolen the IP of the circuit corresponding to the first vectorized graph embedding. In some embodiments, calculating the similarity score may comprise calculating cosine similarity between the first vectorized graph embedding and the second vectorized graph embedding.

In some embodiments, the plurality of base-level files may comprise register transfer level (RTL) files, gate-level netlist files, physical layout (GDSI) files, or a combination thereof. In some embodiments, the graph may be selected from a group comprising a control flow graph, a data flow graph, and an abstract syntax tree. In some embodiments, the GNN (500) may comprise two GCN layers which may comprise 150 to 250 hidden units per layer. Furthermore, the GNN (500) may comprise one MLP layer that reduces the hidden units of each layer to two hidden units.

Figure 2:
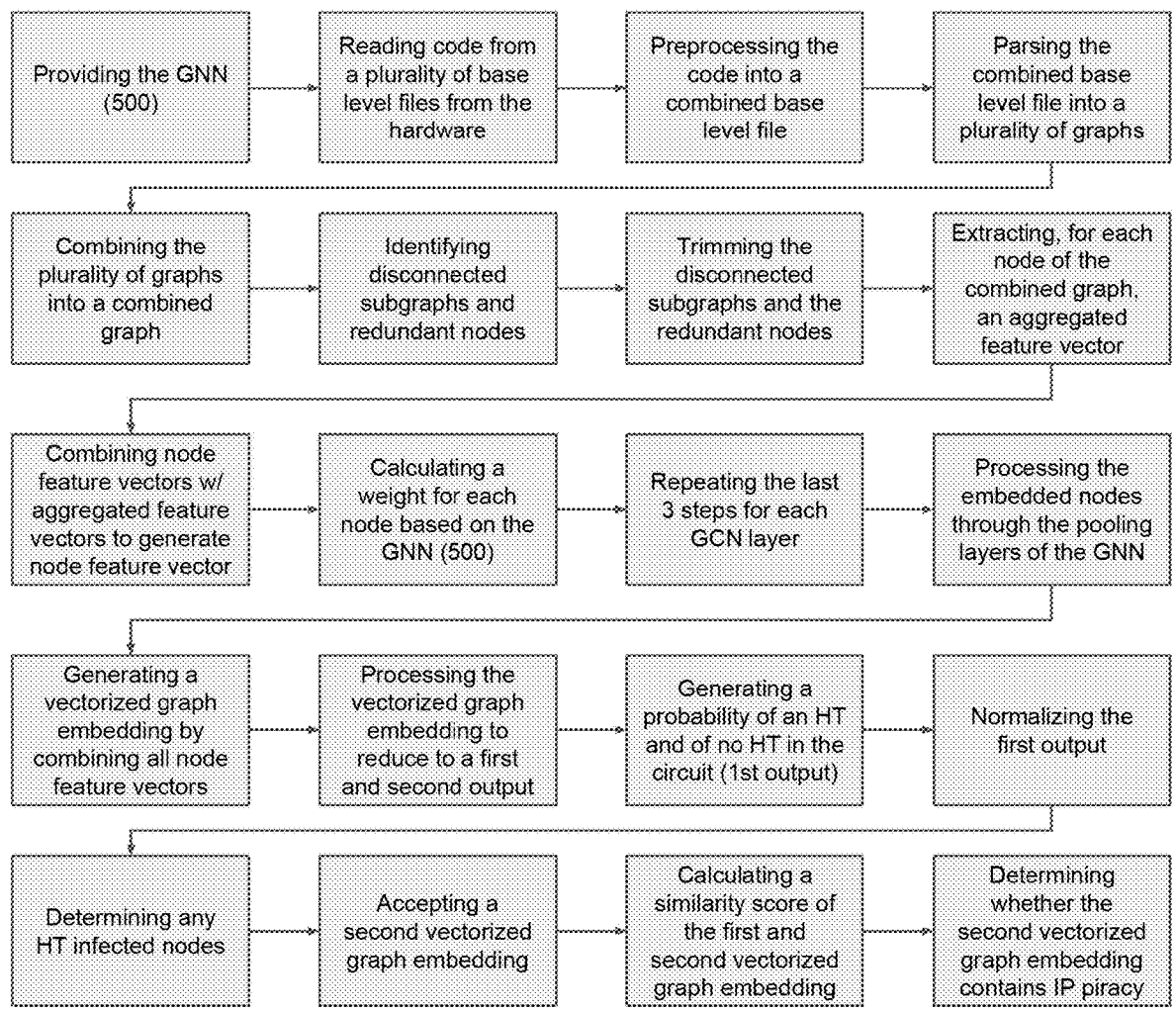
FIG. 2 shows a flow chart of a method for HT and IP piracy detection of the present invention.
Figure 3:
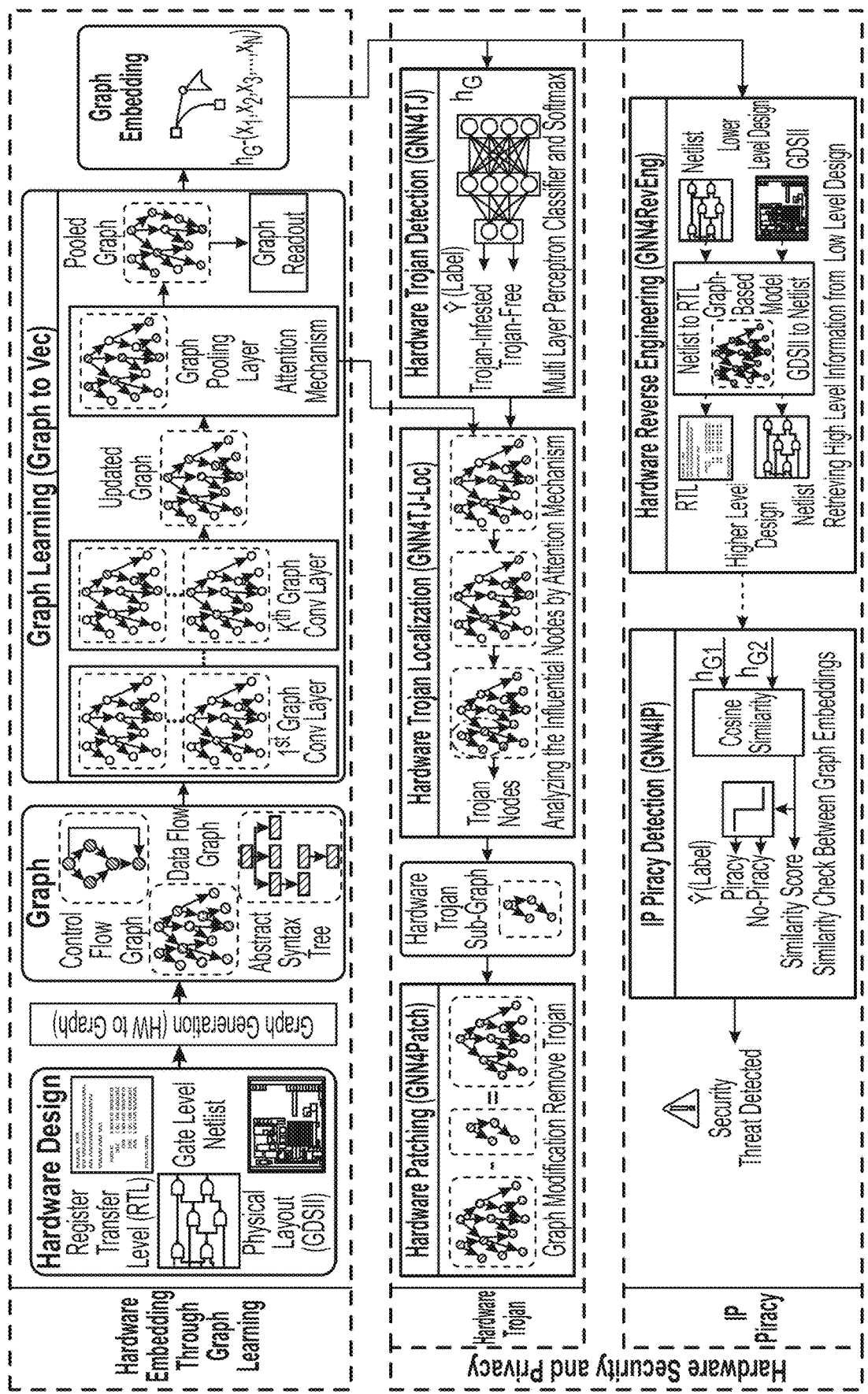
FIG. 3 shows an overview of the HT detection and removal and IP piracy detection methodology of the present invention.
Figure 4:
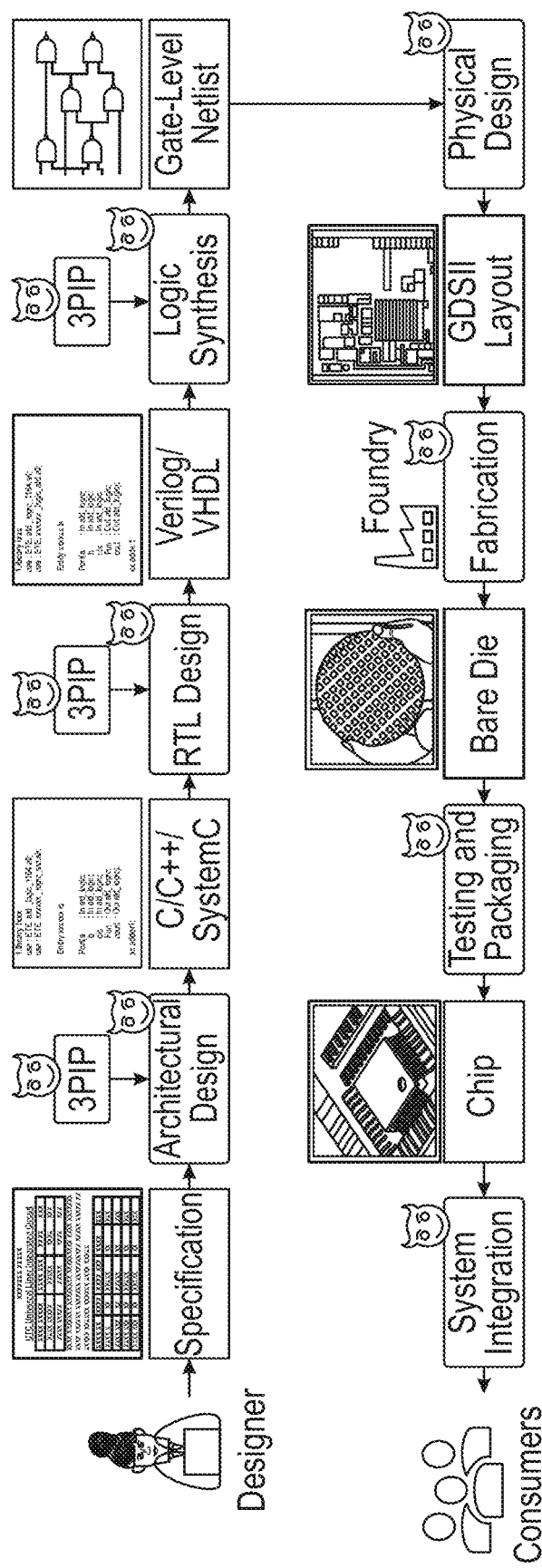
FIG. 4 shows an example of an IC supply chain and where it is vulnerable to HT insertion.

Referring now to FIG. 2, the present invention features a method for detecting hardware Trojans and IP piracy in a circuit. The circuit may comprise a plurality of signals which may comprise input signals and output signals. The method may be based on a GNN. In some embodiments, the method may comprise the GNN (500). The GNN (500) may comprise one or more graph convolutional neural network (GCN) layers, one or more pooling layers, and one or more multilayer perceptron (MLP) layers. The GNN (500) may be trained by a training set of hardware Trojan infected circuits and similar hardware designs mapped to embedding vectors nearby. The method may further comprise reading code from a plurality of base-level files from the hardware, preprocessing the code from the plurality of base-level files into a combined base-level file, and parsing the combined base-level file into a plurality of graphs. In some embodiments, parsing the combined base level file into a plurality of graphs may comprise parsing the combined base level file into an abstract syntax tree (AST) and generating the plurality of graphs from the AST. Each graph of the plurality of graphs may represent a signal from the plurality of signals such that the signal may be a root node of the graph. The method may further comprise combining the plurality of graphs into a combined graph. The combined graph may connect the output signals of the circuit to the input signals of the circuit with a root-to-leaf relationship. The method may further comprise identifying any disconnected subgraphs and any redundant nodes in the combined graph and trimming the disconnected subgraphs and the redundant nodes from the combined graph.

The method may further comprise applying the GNN (500) to the combined graph. In some embodiments, applying the GNN (500) may comprise extracting, for each node of the combined graph, an aggregated feature vector. The aggregated feature vector may comprise a plurality of features collected from any neighboring nodes of the node. Applying the GNN (500) may further comprise combining, for each node, a node feature vector of the node with the aggregated feature vector of the node to generate a node feature vector of any incoming neighbor nodes of the node and calculating a weight for each node based on the GNN (500). Extracting the aggregated feature vector for each GCN layer, combining nodes, and assigning weights may be repeated for each layer of the GNN (500). Each repetition may generate a node feature vector for each node, wherein the last repetition results in an embedded node and a final weight for each node. Applying the GNN (500) may further comprise processing the plurality of embedded nodes through the pooling layers of the GNN (500) resulting in a pooled set of embedded nodes, generating a vectorized graph embedding by combining, each embedded node of the pooled set of embedded nodes, all node feature vectors, and processing the vectorized graph embedding through the multilayer perceptron layers of the GNN (500) to reduce an overall output of the present method to a first output and a second output. In some embodiments, processing the plurality of embedded nodes through the pooling layers of the GNN (500) may comprise top-k filtering. The pooling layers may implement a pooling ratio of about 0.8 to aid the top-k filtering. In some embodiments, processing the plurality of embedded nodes through the pooling layers of the GNN (500) may comprise top-k filtering. The pooling layers may implement a pooling ratio of 0.8 to aid the top-k filtering.

The method may further comprise generating, based on the GNN (500), the first output of the vectorized graph embedding may comprise a first two-dimensional value. The first two-dimensional value may comprise a probability of an HT in the circuit and a probability of no HT in the circuit. The method may further comprise normalizing the first output and determining if the first output has returned a greater probability of an HT, based on the plurality of final weights, a plurality of HT infected nodes. In some embodiments, the method may further comprise removing the plurality of HT infected nodes from the combined graph and recreating the plurality of base-level files based on the combined graph with HT removed.

The method may further comprise accepting a second vectorized graph embedding from the Graph-to-Vector module (200), calculating, based on the GNN (500), the second output. The second output may comprise a similarity score of the first vectorized graph embedding and the second vectorized graph embedding. The method may further comprise determining based on the similarity score whether a second circuit corresponding to the second vectorized graph embedding contains IP piracy of the circuit corresponding to the first vectorized graph embedding. In some embodiments, calculating the similarity score may comprise calculating cosine similarity between the first vectorized graph embedding and the second vectorized graph embedding.

In some embodiments, the plurality of base-level files may comprise register transfer level (RTL) files, gate-level netlist files, physical layout (GDSII) files, or a combination thereof. In some embodiments, the graph may be selected from a group comprising a control flow graph, a data flow graph, and an abstract syntax tree. In some embodiments, the GNN (500) may comprise two GCN layers which may comprise 150 to 250 hidden units per layer. Furthermore, the GNN (500) may comprise one MLP layer that reduces the hidden units of each layer to two hidden units.

Figure 5:
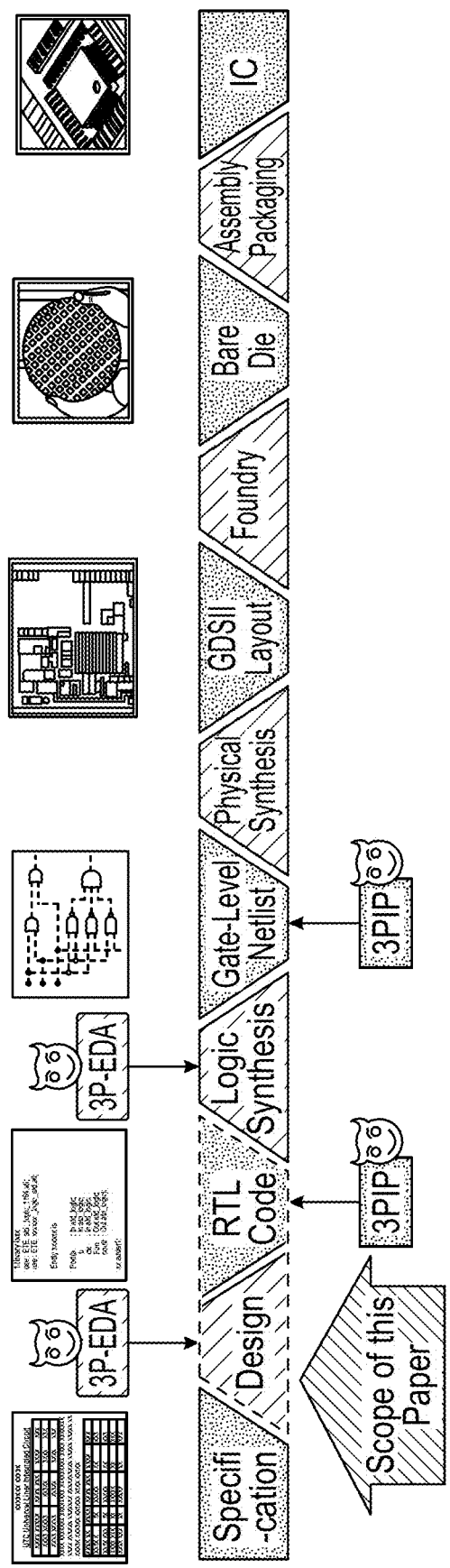
FIG. 5 shows a semiconductor supply chain and where it is vulnerable to soft IP theft.

The present invention implements a novel automated methodology that proposes three main contributions to the IC security domain. The first methodology is titled HW2VEC, as illustrated in FIG. 5. It may comprise two main parts: HW2Graph and Graph2VEC. The graph generation tool (HW2Graph) may convert the hardware design in different levels of abstraction including Register Transfer Level (RTL), gate-level netlist, or physical layout (GDSII) to a graph representation selected from a group comprising a control flow graph, a data flow graph, or an abstract syntax tree. According to the application, the appropriate graph presentation may be used to construct a graph learning model (Graph2VEC) which may learn the behavior of the circuit leveraging the state-of-the-art machine learning technique, a graph neural network. This model may produce a vectorized embedding that may embed the key features of the hardware design and may be further used in the following methodologies to identify and mitigate the security threats in the circuit.

The second methodology may be designed as a defense mechanism against HT. Using the generated embedding from HW2VEC, a classifier may be trained to detect HT and label a circuit as Trojan-free or Trojan-infested. After the detection, the graph representation of the infected circuit may be analyzed further to localize the HT. The attention mechanism from HW2VEC may make the model able to focus on the part of the graph which is mostly responsible for the model decision (output label). Thus, the defense mechanism may generate a score for each node according to its influence in the HT detection which is utilized to determine the HT nodes. Lastly, a hardware patching tool is implemented to automatically remove the HT in graph level and re-create the hardware design from its graph representation.

Another area of contribution may be hardware IP security. In this regard, two tools may be implemented for reverse engineering and IP piracy detection. Reverse engineering may involve retrieving the high-level information from the low-level design which may be used from physical layer to gate-level netlist or from netlist to RTL design. To develop the IP piracy detection, the graph neural network model may be trained to map similar hardware designs to embedding vectors in close proximity. Therefore, the piracy between two IPs by comparing their embeddings may be determined. A similarity score can indicate how much the designs are similar and the threshold may be learned to determine the output label as piracy or no-piracy.

There exists a feed-forward function $f$ that outputs whether a RTL program p has a HT or not through a label y as given in Equation 1.

$$y = f(p) = \begin{cases} (1, 0), & \text{if the program has a } HT \\ (0, 1), & \text{if the program has no } HT \end{cases} \quad (1)$$

The present invention features a model for approximating function $f$. The overall architecture of GNN4TJ is illustrated in FIG. 8. The first step is to extract the DFG G from each RTL program p that is achieved by a DFG generation pipeline. In the second step, these DFGs are passed to a GNN framework that includes graph convolution layers and an attention-based graph pooling layer. The graph-level representation for a DFG G, denoted as $h_G$, is then acquired by a graph readout operation. Lastly, a Multi-Layer Perceptron (MLP) Network is used with a Softmax activation function to process $h_G$ and to compute the final HT inference, denoted as $\hat{y}$.

A plurality of HT insertion scenarios may be considered by the present invention. (1) 3PIP vendor is not trusted, and a malicious circuit is hidden in the IP. (2) The 3P-EDA used for design synthesis and analysis inserts an HT automatically. (3) A rogue in-house designer intentionally manipulates the RTL design. (4) The design is tampered with in the later stages (gate-level netlist, physical layout, or bare die), and the RTL design is derived using reverse-engineering techniques.

Figure 6:
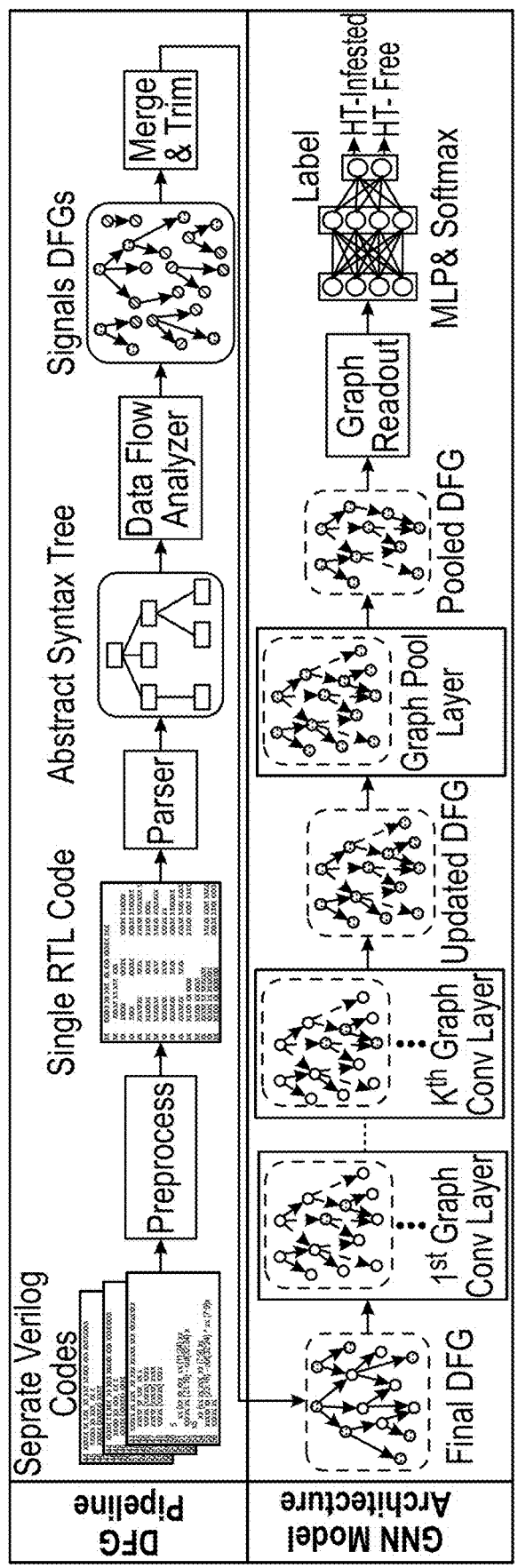
FIG. 6 shows the methodology workflow of the present invention including a DFG generation pipeline and GNN model architecture for HT detection.

The hardware design may be a non-euclidean, structural type of data similar to the graph data structure. As RTL representation, DFG is used, which indicates the relationships and dependencies between the signals and gives a fundamental expression of the code's computational structure. As pictured in FIG. 6, the automated DFG generation pipeline of the present invention may comprise several phases: preprocess, parser, data flow analyzer, and merge. An RTL code may comprise several modules in separate files, and the preprocessing step may be needed to flatten the design and resolve syntax incompatibilities. Next, a hardware design toolkit, called Pyverilog may be used, in which a parser extracts the abstract syntax tree from Verilog code and passes it to the data flow analyzer to generate a Tree for each signal in the circuit such that the signal is the root node. To have a single graph representation for the whole circuit, all the signal DFGs may be combined. Further, disconnected sub-graphs and redundant nodes may be trimmed in the merge phase.

Figure 7:
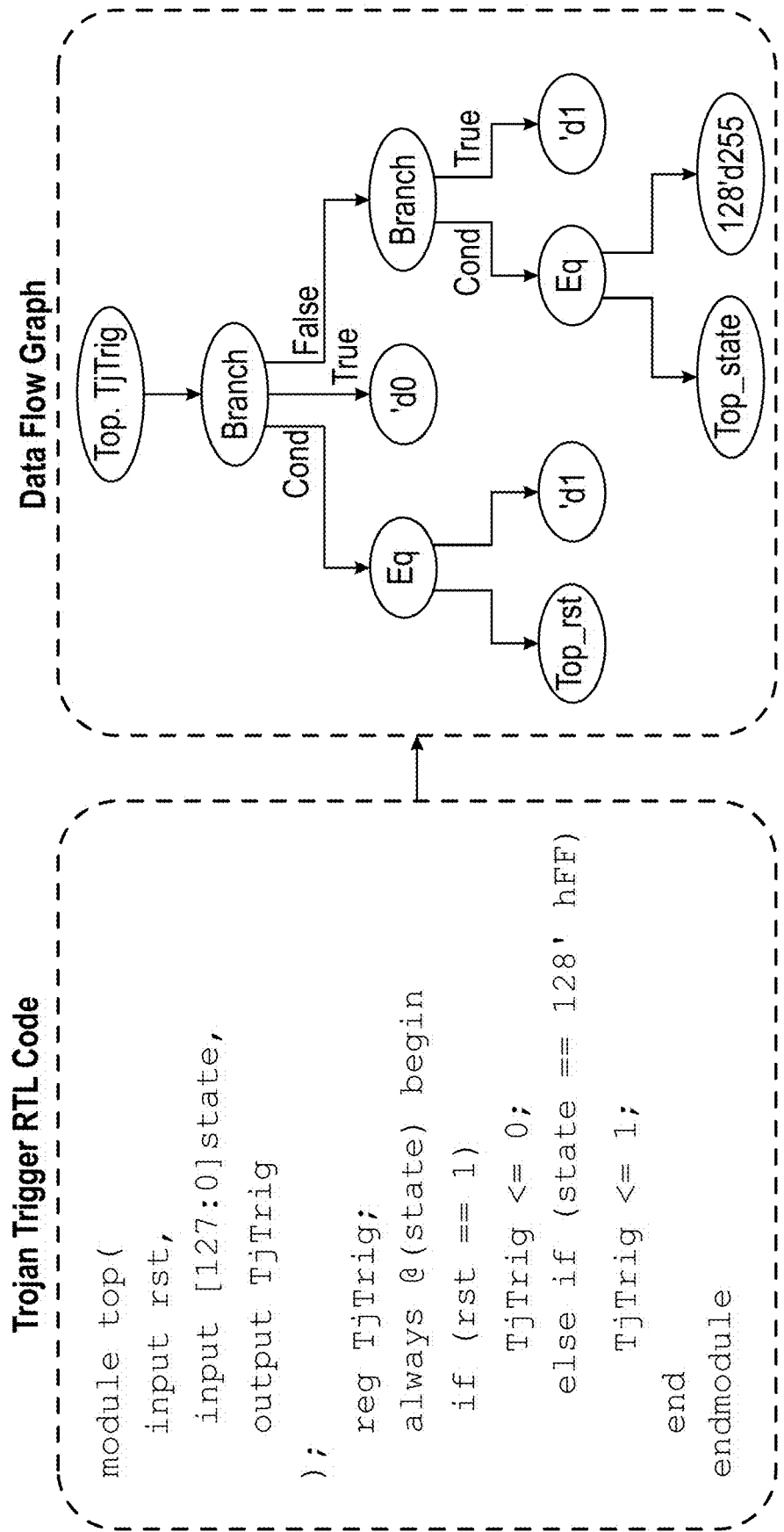
FIG. 7 shows the RTL code of a Trojan trigger and its DFG.
Figure 11:
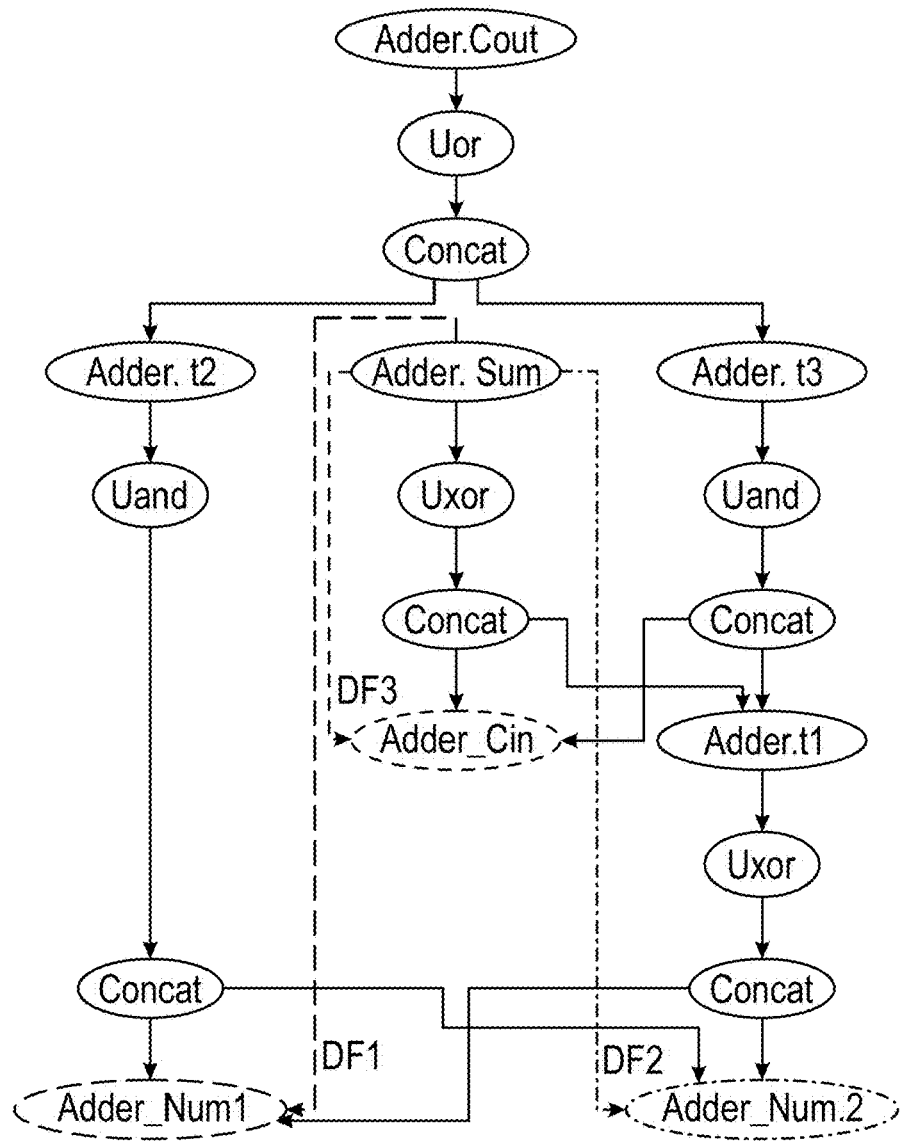
FIG. 11 shows full adder circuit schematic and two different versions of Verilog codes, and DFGs.
Figure 12:
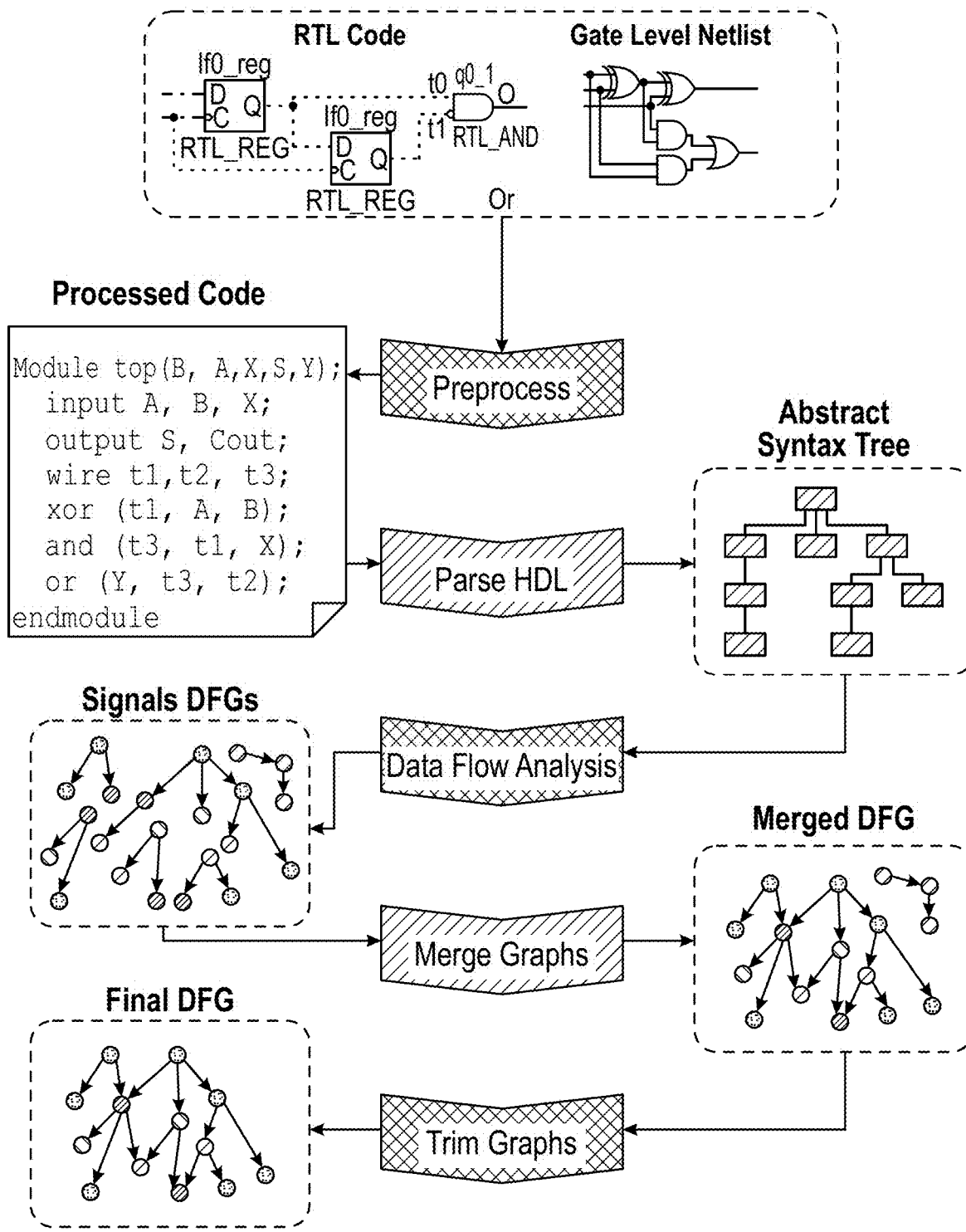
FIG. 12 shows a data flow graph generation pipeline for RTL code and netlist.

The final DFG may be a rooted directed graph that shows data dependency from the output signals (the root nodes) to the input signals (the leaf nodes). It may be defined as graph G=(V, E) where E is the set of directed edges and V is the set of vertices. V may be defined as $V=\{v_1, v_2, \ldots, v_n\}$ where $v_i$ represents signals, constant values, and operations such as xor, and, concatenation, branch, or branch condition. E may be defined as $E=e_{i,j}$ for all i,j such that $e_{ij} \in E$ if the value of $v_i$ depends on the value of $v_j$, or if the operation $v_j$ is applied on $v_i$. An RTL code and its DFG are exemplified in FIG. 7.

GNN is deep learning that operates on graphs. The architecture used in GNN4TJ may partially implement a Spatial Graph Convolution Neural Network (SGCN). In general, SGCN defines the convolution operation based on a node's spatial relations. The spatial convolution has the following phases: (i) message propagation phase and (ii) the read-out phase. The message propagation phase involves two sub-functions: AGGREGATE and COMBINE functions, given by, $$a_v^{(k)} = \text{AGGREGATE}^{(k)}(\{h_u^{(k-1)}: u \in N(v)\}) \quad (2)$$

$$h_v^{(k)} = \text{COMBINE}^{(k)}(h_u^{(k-1)}, a_v^{(k)}) \quad (3)$$

where $h_v^k \in R^{c^k}$ denotes the feature vector after k iterations for the v-th node. Essentially, the AGGREGATE collects the features of the neighboring nodes to extract an aggregated feature vector $\alpha_v^{(k)}$ for the layer k, and the COMBINE combines the previous node feature $h_v^{(k-1)}$ with $\alpha_v^{(k)}$ to output next feature vector $h_v^{(k)}$. This message propagation may be carried out for a predetermined number of iterations k. Next, in the read-out phase, the overall graph-level feature extraction is carried out by either summing up or averaging up the node features in each iteration. The graph embedding $h_G^{(k)}$ may be employed to model the behavior of circuits and identify HT. $h_G^{(k)}$ may be defined as, $$h_G^{(k)} = \text{READOUT}(\{h_v^{(k-1)}: v \in G\}) \quad (4)$$

In the present invention, hardware design may be modeled by firstly extracting the DFG from the circuit and then applying the graph learning pipeline to acquire the embedding of hardware designs. To process each circuit in its DFG form, the GNN framework may be employed with the architecture depicted in FIG. 6. In the phase of message propagation, the layer that may be referred to as process G is a Graph Convolution Network (GCN). In each iteration I of message propagation, a GCN layer may update the node embeddings $X^{l+1}$ as follows, $$X^{(l+1)} = \sigma\left(\hat{D} - \frac{1}{2}\hat{A}\hat{D} - \frac{1}{2}X^{(l)}W^{(l)}\right) \quad (5)$$

where $W^l$ is a trainable weight used in the GCN layer. $\hat{A}=A+I$ may be the adjacency matrix of G used for aggregating the feature vectors of the neighboring nodes where I may be an identity matrix that adds the self-loop connection to make sure the features calculated in previous iteration are also considered in the current iteration. $\hat{D}$ may be the diagonal degree matrix used for normalizing $\hat{A}$. $\sigma(\cdot)$ may be the activation function such as Rectified Linear Unit (ReLU). Here, the embedding $X_I^{(0)}$ may be initialized for each node $i \in V$ by converting the node's name to its corresponding one-hot encoding. The final propagation node embedding $X^{(l)}$ may be denoted as $X^{prop}$.

The node embedding $X^{prop}$ may be further processed with an attention-based graph pooling layer. Such an attention-based pooling layer may allow the model to focus on a local part of the graph and may be considered as a part of a unified computational block of a GNN pipeline. In this layer, the present invention may perform top-k filtering on nodes according to the scores predicted from a separate trainable GNN layer, as follows:

$$\alpha = \text{SCORE}(X^{prop}, A), \quad (6)$$
$$P = \text{top}_k(\alpha)$$

where $\alpha$ stands for the coefficients predicted by the graph pooling layer for nodes. P may represent the indices of the pooled nodes which are selected from the top k of the nodes ranked according to $\alpha$. The number k used in top-k filtering may be calculated by a predefined pooling ratio, pr using $k=\text{pr} \times |O_l|$, where the present invention considers only a constant fraction pr of the embeddings of the nodes of the DFG to be relevant (i.e., 0.5). The present invention may denote the node embeddings and edge adjacency information after pooling by $X^{pool}$ and $A^{pool}$ which may be calculated as follows:

$$X^{pool} = (X^{prop} \odot \tanh(\alpha))_p, \quad (7)$$

$$A^{pool} = A^{prop}_{(P,P)}$$

where $\odot$ represents an element-wise multiplication, $O_P$ refers to the operation that extracts a subset of nodes based on P and $O_{(P,P)}$ refers to the information of the adjacency matrix between the nodes in this subset. Then, the model of the present invention may aggregate the node embeddings acquired from the graph pooling layer, $X^{pool}$, to acquire the graph-level embedding $h_G$ for DFG G.

$$h_G = \text{READOUT}(X^{pool}) \quad (8)$$

where the READOUT operation may be summation, averaging, or selecting the maximum of each feature dimension, over all the node embeddings, denoted as sum-pooling, mean-pooling, or max-pooling respectively. Lastly, the model processes the embedding $h_G$ of a RTL code with a MLP layer and a Softmax activation function to produce the final prediction $\hat{Y}$=Softmax (MLP($h_G$)). This layer may reduce the number of hidden units used in $h_G$ and generate a 2-dimensional output that may represent the probabilities of both classes (HT or non-HT). Finally, the predicted values in $\hat{Y}$ may be normalized using Softmax function and the class with higher predicted value may be taken as the result of detection. To train the model, the present invention may compute the cross-entropy loss function, denoted as H, between ground-truth label Y and the predicted label $\hat{Y}$, described as follows, $$H(Y, \hat{Y}) = \sum_{y_i \in Y, \hat{y}_i \in \hat{Y}} y_i \log_e(\hat{y}_i) \quad (9)$$

In the present invention, the problem of IP piracy detection is formulated as finding the similarity between two hardware designs. The present invention assumes the existence of a feed-forward function $f$ that outputs whether two circuits $p_1$ and $p_2$ are subject to piracy or not through a binary label y as given in Equation 10.

$$y = f(p_1, p_2) = \begin{cases} (1, 0) & \text{if piracy in } p_1, p_2 \\ (0, 1) & \text{if no-piracy in } p_1, p_2 \end{cases} \quad (10)$$

To approximate $f$, the present invention extracts the DFGs $G_A$ and $G_B$ from circuit pair ($p_1$, $p_2$) using the DFG generation pipeline. Then, the process passes ($G_A$, $G_B$) to a graph embedding layer, HW2VEC, to acquire the graph-level embeddings ($h_{G_A}$, $h_{G_B}$). Lastly, the present model infers the piracy label, denoted as $\hat{Y}$, by computing the cosine similarity between $h_{G_A}$ and $h_{G_B}$.

In the threat model, the present invention examines the IP designs in RTL or gate-level netlist to discover piracy. The design may be a soft IP, firm IP, or derived by reverse engineering a hard IP or IC. The adversary may be a hardware designer, competitor company, or the fabrication foundry who present the stolen IP as their genuine design and sell it as an IC or an IP at the same or lower level of abstraction. The attack scenario may involve modification of IP design to tamper piracy detection. The attacker may get access to the original IP through one of these means: I) purchase the IP for limited usage, II) leaked through a rogue employee in the design house, or III) reverse engineered the physical layout/IC.

Figure 13:
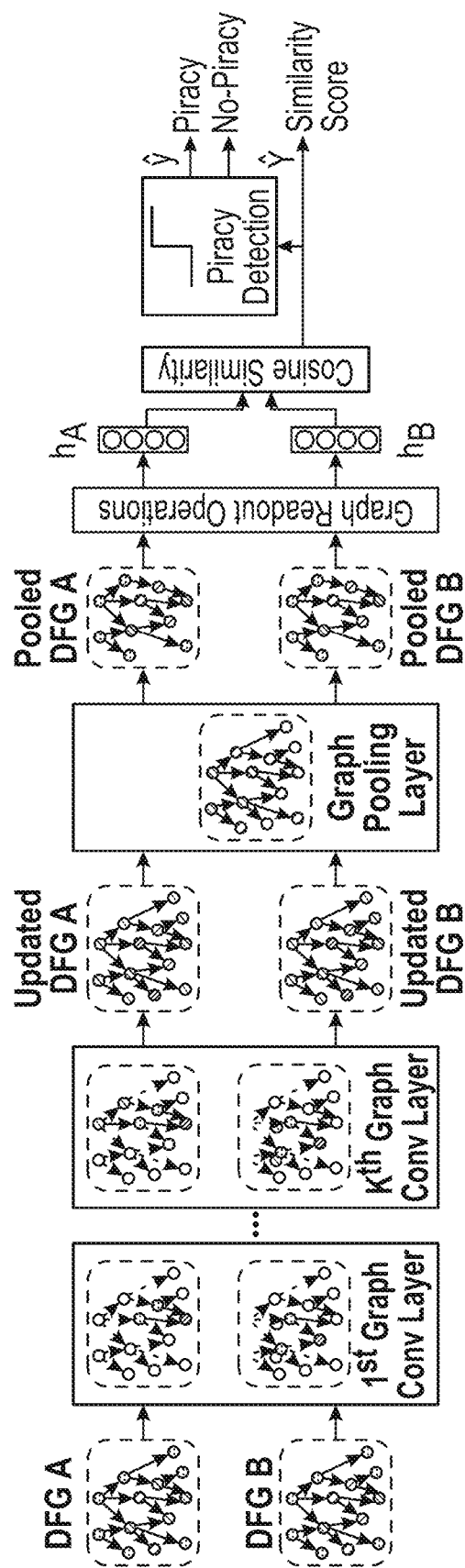
FIG. 13 shows an overall architecture for an IP piracy component of the present invention for hardware IP piracy detection.

In the present algorithm, GNN4IP refers to approximating function $f$, which can yield the inference of whether two circuits $p_1$ and $p_2$ are subject to IP piracy. Applying typical machine learning methodologies to hardware designs, which may be non-euclidean in nature, usually requires feature engineering and immense expert knowledge in hardware design languages. Therefore, the present invention implements HW2VEC that utilizes the DFG of a circuit and applies a GNN framework to acquire the corresponding representation of features $h_p$ for each hardware design p. The architecture of IP piracy detection is depicted in FIG. 13.

The HW2VEC uses the DFG generation pipeline and acquires the corresponding graph G for circuit p in the form of (X, A) where X represents the initial list of node embeddings and A stands for the adjacency information of G. Next, the HW2VEC begins the message propagation phase, denoted as Graph Conv in the algorithm, which is Graph Convolution Network (GCN). In each iteration/of message propagation, the node embeddings $X^{l+1}$ will be updated as in equation 5, wherein the corresponding adjacency matrix is denoted as $A^{prop}$.

Once propagated the information on G, the resultant node embedding XPMP is further processed with an attention-based graph pooling layer Graph Pool. Denote the collection of all node embeddings of G after passing through L layers of GCN as $X^{prop}$. The $X^{prop}$ is passed to a self-attention graph pooling layer that learns to filter out irrelevant nodes from the graph, creating the pooled set of node embeddings $X^{pool}$ and their edges $A^{pool}$. In this layer, the present invention implements a graph convolution layer to predict the scoring $\alpha$=SCORE($X^{Prop}$, $A^{prop}$) and use a to perform top-k filtering over the nodes in the DFG.

Then, the Graph Readout in the algorithm aggregates the node embeddings $X^{pool}$ to acquire the graph-level embedding $h_G$ for the DFG G using this formula $h_G$=READOUT($X^{pool}$). The READOUT operation may be either summation, averaging, or selecting the maximum of each feature dimension over all the node embeddings, denoted as sum-pooling, mean-pooling, or max-pooling respectively. Lastly, HW2VEC returns the embedding ho of each hardware.

The gnn4ip defines the primary procedure that processes a pair of hardware design programs $p_1$ and $p_2$ and returns the result of whether one of which is an IP piracy to each other. The gnn4ip utilizes hw2vec to transform $p_1$ and $p_2$ into the corresponding DFG embeddings, denoted as $h_{p_1}$ and $h_{p_2}$. Then, gnn4ip calculates the cosine similarity of $h_{p_1}$ and $h_{p_2}$ to produce the final IP piracy prediction, denoted as $\hat{Y} \in [-1, 1]$. The formula can be written as follows, $$\hat{Y} = \text{Cosine\_sim}(h_{p_1}, h_{p_2}) = \frac{h_{p1} \cdot h_{p2}}{|h_{p1}||h_{p2}|} \quad (11)$$

Finally, gnn4ip utilizes predefined decision boundary $\delta$ and $Y\hat{}$ to judge whether two programs $p_1$ and $p_2$ are a piracy to one another and to return the results of IP piracy detection using a binary label (0 or 1).

As both gnn4ip and HW2VEC include several trainable parameters, these parameters for IP piracy detection need to be trained via computing the cosine embedding loss function, denoted as H, between true label Y and the predicted label $\hat{Y}$. The calculation of loss can be described as follows, $$H(\hat{Y}, Y) = \begin{cases} 1 - \hat{Y}, & \text{if } Y = 1 \\ \max(0, \hat{Y} - \text{margin}) & \text{if } Y = -1 \end{cases} \quad (12)$$

where the margin is constant to prevent the learned embedding to be distorted. Once the model is trained, the present algorithm uses the $\hat{Y}$ and a decision boundary $\delta$ to make the final judgment of IP piracy.

EXAMPLE

The present invention used 2 GCN layers with about 200 hidden units for each layer. For the graph pooling layer, the present invention used the pooling ratio of 0.8 to perform top-k filtering. For READOUT, the present invention used max-pooling for aggregating node embeddings of each graph. The present invention used 1 MLP layer to reduce the number of hidden units from 200 to 2 used in $h_G$ for predicting the result of HT detection. In training, the present invention appended a dropout layer with a rate of 0.5 after each GCN layer. The present invention trained the model for 200 epochs using the batch gradient descent algorithm with batch size 4 and the learning rate 0.001.

A HT comprised two fundamental parts: payload and trigger. The payload was the implementation of the malicious behavior of HT to leak data leakage, change the functionality, deny the service, or degrade the performance. The trigger was the optional circuit that monitored various signals or events in the base circuit and activated the payload when a specific signal or event was observed. The present invention classified the triggers of HT benchmarks into three main categories; i) time bomb, ii) cheat code, and iv) always on. The time bomb trigger was activated after numerous clock cycles and the cheat code trigger depended on one or a sequence of specific inputs in the base circuit.

The present invention created a HT dataset based on the benchmarks in Trusthub that contained 34 varied types of HTs inserted in 3 base circuits: AES, PIC, and RS232. To expand the dataset, the present invention extracted the HT design and used them as additional data instances. Moreover, the present invention integrated some of the extracted HTs to new HT-free circuits, DES and RC5, which increased the HT-infested samples. To balance the dataset and increment the number of HT-free samples, the present invention added the different variations of current circuits in addition to new ones, including DET, RC6, SPI, SYN-SRAM, VGA, and XTEA to the dataset that resulted in a dataset of HT-Free and HT-infested codes with 100 instances.

The present invention aimed to evaluate GNN4TJ performance in unknown HT detection. To detect the HTs in a base circuit, the present invention left the base circuit benchmarks for testing and trained the model with the other benchmarks. In this setup, the test circuit and Trojans were unknown to the model. The present invention repeated it about 20 times for each base circuit and count True Positive (TP), False Negative (FN), and False Positive (FP) to calculate the evaluation metrics, Precision (P), Recall (R) or True Positive Rate, and F$\beta$ score as follows:

$$P = \frac{TP}{TP + FP}, R = \frac{TP}{TP + FN}, F_\beta \text{score} = \frac{(1 + \beta^2) * P * R}{\beta^2 * P + R}$$

This testing scenario imitated the situation that neither the HT was known nor the golden HT-free reference of the circuit under test was seen by the model in training. Recall expressed the model's ability to detect the HTs or, in other words, what percentage of HT-infested samples were detected by the model. This metric was intuitive, but it was not sufficient for evaluation, especially in an unbalanced dataset. It was essential to analyze the false positive, the numbers of HT-free samples incorrectly classified as HT. Thus, the present invention computed precision that demonstrated what percentage of the samples that model classified as HT-infested actually contained HT. F$\beta$ score was the weighted average of precision and recalled that better presented performance. Dataset played an important role in the performance of the model. As it is pictured in FIG. 9, GNN4TJ had higher scores for AES, RC5, and DES because these circuits were all encryption cores and the model had more data instances to learn their behavior. Similarly, the performance for RS232 and PIC was enhanced by gathering a more comprehensive dataset with similar types of circuits to PIC and RS232.

The model was trained and tested on a server with two NVIDIA TITAN-XP and NVIDIA GeForce GTX 1080 graphics cards. The timing results for the base circuits are summarized in FIG. 8B. Although the training was time-consuming, it occurred once, and the trained model found the HT very fast at 21.1 ms on average faster than prior systems.

As qualitative metrics, 3 essential characteristics were investigated: i) golden reference-free, ii) unknown HT detection, and iii) automated process. The construction of an HT detection model without white-box knowledge of the IP was challenging. An effective and uniform approach did not rely on any trusted reference design since it was not available in reality. Generally, the algorithmic approaches satisfied this quality while ML techniques failed. Another important factor was the capability to find different types of HTs, even the unknown ones. Regarding this factor, ML-based approaches were more successful in extracting the intuitive features from circuits to recognize a variety of HTs. The detection scope of other techniques was limited to the HTs that already exist in the method's library or had properties that were predefined. To the best of the knowledge, all the existing approaches required feature engineering or manual property definition. However, in the present approach, not only HT detection but also the feature extraction process was automated. Hence, the model was easily expanded by training on various circuits and scaled for industrial-level IP design. Furthermore, the model got updated by retraining if a new type of HT was discovered, and it did not require manual effort to extract the new set of properties or features.

As quantitative metrics, precision, recall, and timing were observed. For timing, the average detection time for the AES benchmarks were compared. Since the papers' computing platforms were different, the exact comparison between the reported timing numbers was not reasonable. However, the order of magnitude of timing results was useful for general comparison, and it showed that the model was much faster than the others. The timing of algorithmic methods (FV, CA, and GM) highly depended on hardware design complexity. Their memory usage and detection time drastically grew for large designs that caused timeout or memory shortage problems. On the other hand, the circuit's complexity did not have a notable effect on the detection time of GNN4TJ according to FIG. 8A, which made it scalable for a large design.

In terms of recall and precision, the present invention had comparable results. Comparison with algorithmic methods was challenging because, in most cases, the authors reported a list of known HT benchmarks that their model successfully detected while the present model was tested on unknown HTs, which mostly were not detectable by those algorithms. Furthermore, FP and IP for computing precision and the performance of the methods on HT-free samples were not available in some papers to compare.

In FIG. 8B, the first top 3 HT benchmarks were known to the Method Under Test (MUT) and existed in MUT's library of HTs whereas the other 3 HTs were unknown. ✓✓ indicated that the MUT could detect the HT and it was explicitly reported in its paper. ✓|χ showed that this case was not tested in the paper but it was supposed to detect not to detect the HT according to authors' claims and assumptions. Graph Matching (GM) methods relied on the HT library and could not recognize the HTs out of the library. Formal Verification (FV) methods depended on the pre-defined property for HTs and could not identify new types of HTs. However, GNN4TJ was an Machine Learning (ML) based method that learned the HT behaviors and was able to pinpoint different types of HT, even the unknown ones.

In hw2vec, 2 GCN layers with 16 hidden units were used for each layer. For the graph pool, the pooling ratio of 0.5 was used to perform top-k filtering. For the graph readout, max-pooling was used for aggregating node embeddings of each graph. In training, apply dropout with a rate of 0.1 was applied after each GCN layer. The model was trained using the batch gradient descent algorithm with batch size 64 and the learning rate to be 0.001.

One of the significant challenges of machine learning model development was data collection. To construct GNN4IP, RTL codes and gate-level netlists of hardware designs were gathered in Verilog format and their DFGs were extracted using an automated graph generation pipeline. The collection comprised 50 distinct circuit designs and several hardware instances for each circuit design that summed up 143 netlists and 390 RTL codes. As the model worked on pairs of hardware instances, a dataset of 19094 similar pairs and 66631 dissimilar pairs was formed, wherein 20% of these 85725 pairs were dedicated for testing and the rest for training.

The GNN4IP examined a pair of hardware designs, labeled it as piracy (positive) or no-piracy (negative), and outputted a similarity score in range [−1, +1] where the higher score indicated more similarity. The model was evaluated on RTL and netlist datasets, which resulted in the confusion matrices depicted in FIG. 14A. The IP piracy detection accuracy was computed as the evaluation metrics, which expressed the correctly labeled sample ratio, true positive (TP) plus true negative (TN), to all data. The accuracy and timing results in FIG. 15A showed that the model pinpointed IP piracy with high accuracy rapidly which made it scalable to large designs. The training and testing time depended on the graph size. The longer timing for netlists lay in the fact that in the dataset, the netlist DFGs with 3500 nodes on average were more extensive than RTL DFGs with 1000 nodes on average. The model ran on a computer with Intel Core i7-7820X CPU @3.60 GHz with 16 GB RAM and two NVIDTA GeForce GTX 1050 Ti and 1080 Ti GPUs and measured the timing for this computing platform.

Figure 14B:
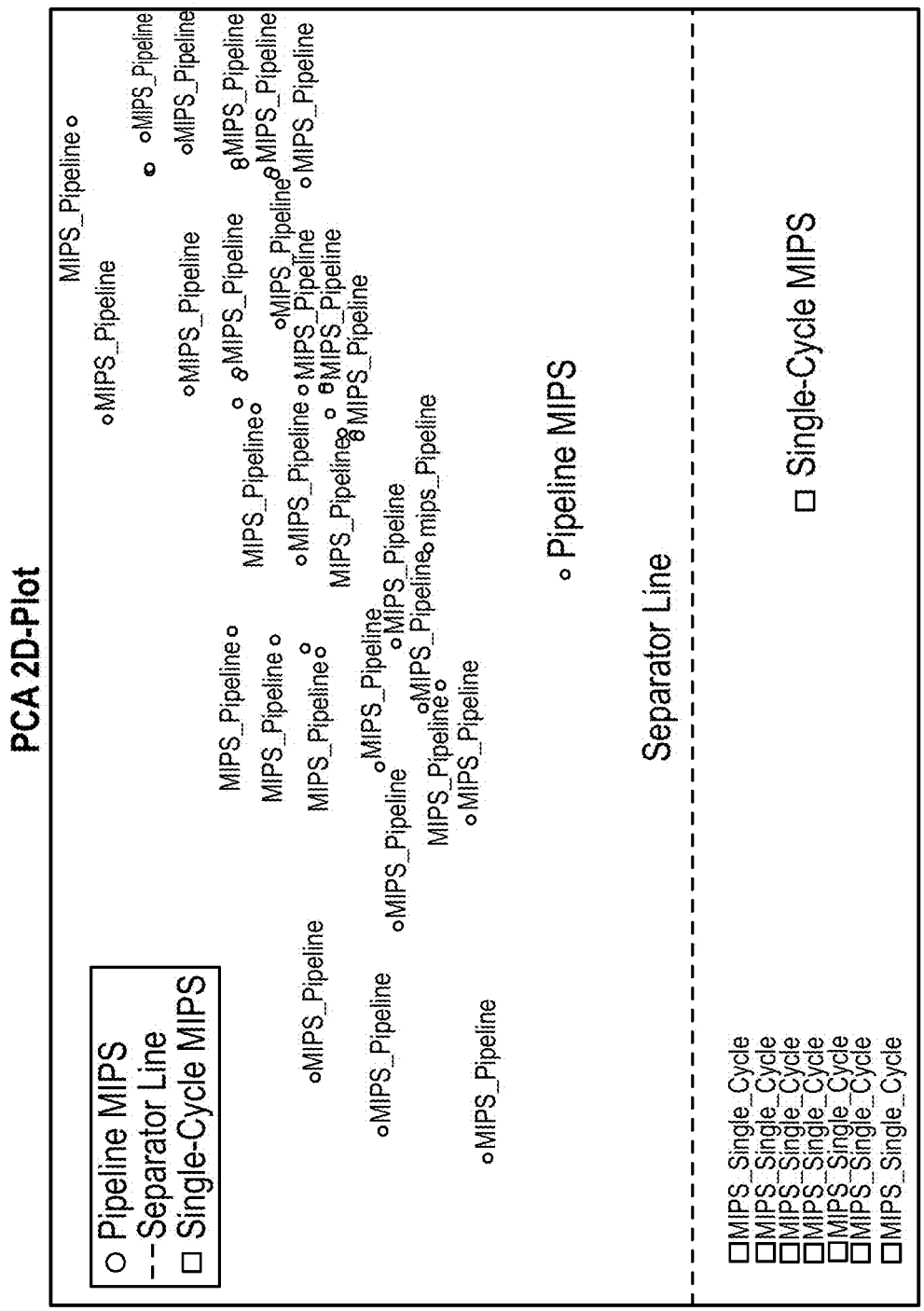
FIG. 14B shows HW2VEC embedding visualization for a dataset of MIPS processors using PCA.
Figure 14C:
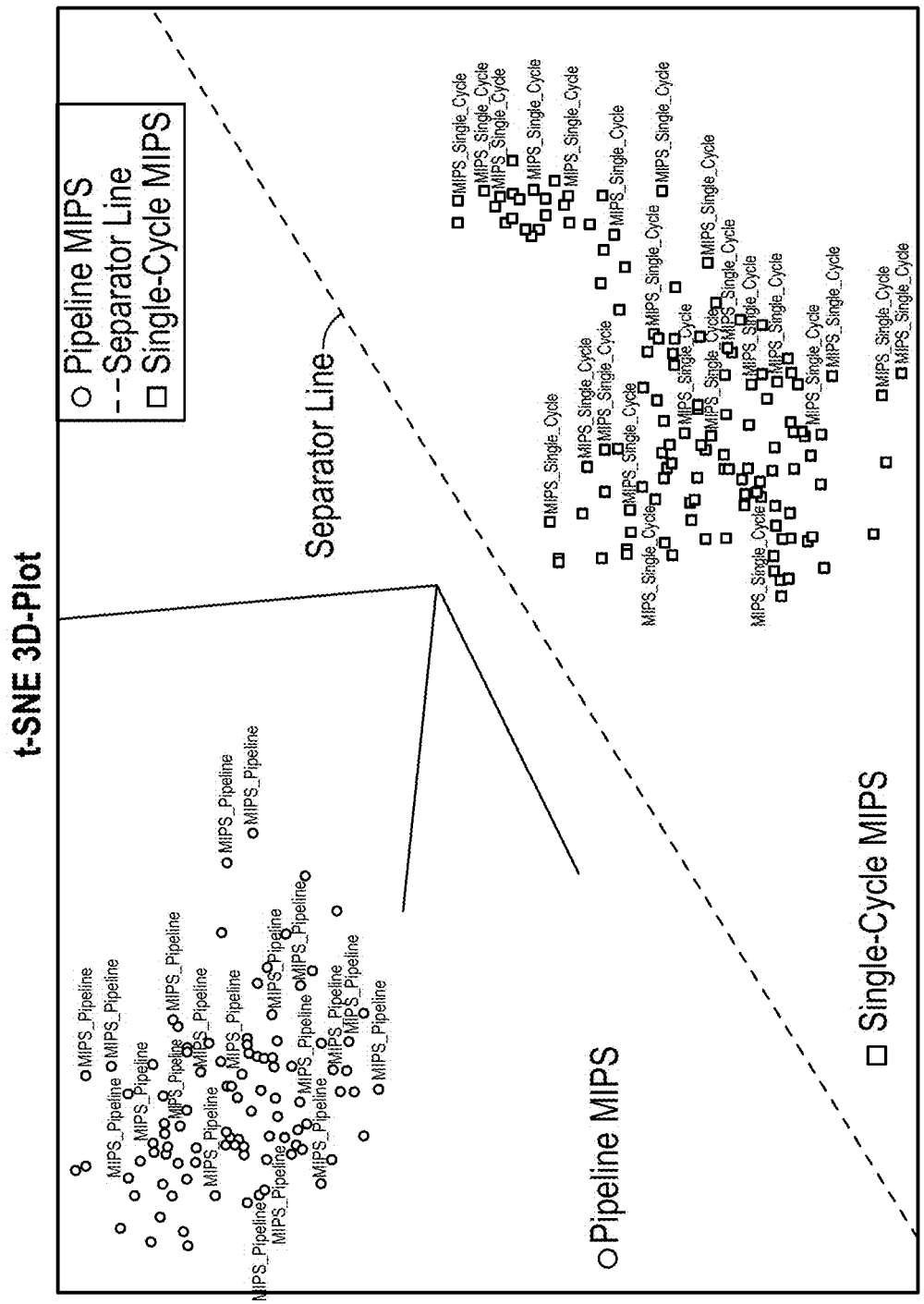
FIG. 14C shows HW2VEC embedding visualization for a dataset of MIPS processors using t-SNE.

The HW2VEC generated vectorized embedding for hardware designs and mapped them to the points in the multi-dimensional space such that similar circuits were nearby. The HW2VEC embeddings were visualized using dimensionality-reduction algorithms such as Principal Component Analysis (PCA) and t-distributed Stochastic Neighbor Embedding (t-SNE). FIGS. 14B-14C illustrate the embedding projection of 250 hardware instances for two distinct processor designs, pipeline MIPS and single-cycle MIPS, using PCA and t-SNE.

In the PCA plot, the first two principal components were depicted that expressed the two orthogonal directions, which maximized the variance of the projected data. t-SNE was a nonlinear machine learning algorithm that performed transformations on the data and approximated spectral clustering. Two MIPS processors were chosen with similar functionality for this experiment to harden the differentiation between them. The processors' contrast lies only in their design and specifications. According to the plots, two well-separated clusters of hardware instances were formed such that data points for the same processor design were close. It demonstrated that HW2VEC was a compelling tool to distinguish between various hardware designs. It not only considered the functionality and DFG structure but also recognized the design.

The model identified piracy based on its generated similarity score for two designs, and the decision boundary was controlled by a hyper-parameter δ. The δ was tuned to achieve maximum accuracy, but this could have been adjusted to decide how much similarity is considered piracy. The similarity score was calculated in 3 cases: 1) different designs, 2) different codes with the same design, and 3) a design and its subset. For each case, 4 examples and the mean score for 50 examples are mentioned in FIG. 15B. As the results present, the model successfully discriminated hardware designs since the score was very low for different designs (case1) and close to 1 for similar designs (case2). In case3, MIPS was a processor which comprised an ALU block. This relation was captured by the model and resulted in a score of approximately 0.5.

To further evaluate the model, it was tested on a dataset of ISCAS'85 benchmarks and their obfuscated instances in the gate-level netlist format, derived from TrustHub. Obfuscation complicated the circuit and confused reverse engineering but did not change the behavior of the circuit. The model recognized the similarity between the circuits despite the obfuscation because it learned the circuit's behavior. This capability of the model was tested in this experiment by comparing each benchmark with its obfuscated instances and computing each benchmark's average similarity score, presented in FIG. 15C. In the experimental results, all the similarity scores were very close to 1. GNN4IP could identify the original IP in the obfuscated design 100% of the time and was resilient against the attacks when the adversary manipulated the design to conceal the stolen IP. Furthermore, the model was assessed on the pairs of different netlist instances, and the resultant average similarity was very low and closer to −1. It demonstrated that GNN4IP was potent in differentiating the varied designs at the netlist level.

The current state-of-the-art IP piracy detection method is watermarking. The concept of accuracy is not defined for it, and another metric called the probability of coincidence ($P_c$) is used. It declares the probability that a different designer inserts the same watermark and depends on the watermark signature size. Although the quantitative comparison with watermarking is not plausible, the false-negative rate provides similar intuition in machine learning. The state-of-the-art outperforms its previous rival algorithms by reporting $P_c=1.11\times10-87$ with the cost of adding 0.13% to 26.12% overhead to design. The model false-negative rate was zero for the netlist and $6.65\times10-4$ for the RTL dataset which was very low and acceptable. Compared to the state-of-the-art, the model had the paramount advantages of zero overhead and resiliency over attacks against watermarking. Moreover, the model was powerful enough to recognize the similarity between designs despite obfuscation.

Instructions that cause at least one processing circuit to perform one or more operations are "computer-executable." Within the scope of the present invention, "computer-readable memory," "memory component," and the like comprises two distinctly different kinds of computer-readable media: physical storage media that stores computer-executable instructions and transmission media that carries computer-executable instructions. Physical storage media includes RAM and other volatile types of memory; ROM, EEPROM, and other non-volatile types of memory; CD-ROM, CD-RW, DVD-ROM, DVD-RW, and other optical disk storage; magnetic disk storage or other magnetic storage devices; and any other tangible medium that can store computer-executable instructions that can be accessed and processed by at least one processing circuit. Transmission media can include signals carrying computer-executable instructions over a network to be received by a general-purpose or special-purpose computer. Thus, it is emphasized that (by disclosure or recitation of the exemplary term "non-transitory") embodiments of the present invention expressly exclude signals carrying computer-executable instructions. However, it should be understood that once a signal carrying computer-executable instructions is received by a computer, the type of computer-readable storage media transforms automatically from transmission media to physical storage media. This transformation may even occur early on in intermediate memory such as (by way of example and not limitation) a buffer in the RAM of a network interface card, regardless of whether the buffer's content is later transferred to less volatile RAM in the computer.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A system for detecting hardware Trojans (HT) and Intellectual Property (IP) piracy in a circuit, the circuit comprising a plurality of signals comprising input signals and output signals, based on a graph neural network (GNN) (500), the system comprising:
   a. a processor capable of executing computer-readable instructions; and
   b. a memory component operatively connected to the processor comprising:
   i. a Hardware-to-Graph module (100) comprising computer-readable instructions for execution by the processor, said instructions comprising:
   A. reading code from one or more base level files from a hardware design;
   B. parsing the one or more base level files into a plurality of graphs, wherein each graph of the plurality of graphs represents a signal from the plurality of signals such that the signal is a root node of the graph;
   C. combining the plurality of graphs into a combined graph, wherein the combined graph connects the output signals of the circuit to the input signals of the circuit with a root-to-leaf relationship;
   D. identifying any disconnected subgraphs and any redundant nodes in the combined graph; and
   E. trimming the disconnected subgraphs and the redundant nodes from the combined graph;
   ii. a Graph-to-Vector module (200) comprising:
   A. the GNN (500) comprising one or more graph convolutional neural network (GCN) layers, one or more pooling layers, and one or more multilayer perceptron (MLP) layers, wherein the GNN (500) is trained by a training set of hardware Trojan infected circuits and similar hardware designs mapped to embedding vectors in close proximity; and
   B. computer-readable instructions for execution by the processor comprising:
   I. accepting the combined graph from the Hardware-to-Graph module (100); and
   II. applying the GNN (500) to the combined graph, wherein applying the GNN (500) comprises:
   a. extracting, for each node of the combined graph, an aggregated feature vector, wherein the aggregated feature vector comprises a plurality of features collected from any neighboring nodes of the node;
   b. combining, for each node, a node feature vector of the node with the aggregated feature vector of the node to generate a node feature vector of any incoming neighbor nodes of the node;
   c. calculating a weight for each node based on the GNN (500);
   d. repeating steps a-c for each GCN layer, wherein each repetition generates a node feature vector for each node, wherein a last repetition results in an embedded node and a final weight for each node;
   e. processing the plurality of embedded nodes through the pooling layers of the GNN (500) resulting in a pooled set of embedded nodes;
   f. generating a vectorized graph embedding by combining, for each embedded node of the pooled set of embedded nodes, all node feature vectors; and
   g. processing the vectorized graph embedding through the multilayer perceptron layers of the GNN (500) to reduce an overall output of the Graph-to-Vector module (200) to a first output and a second output;

iii. a Hardware Trojan Detection module (300) comprising computer-readable instructions for execution by the processor comprising:
   A. accepting the combined graph and the vectorized graph embedding from the Graph-to-Vector module (200);
   B. generating, based on the GNN (500), the first output of the vectorized graph embedding comprising a first two-dimensional value, wherein the first two-dimensional value comprises a probability of a HT in the circuit and a probability of no HT in the circuit;
   C. normalizing the first output; and
   D. determining, if the first output has returned a greater probability of a HT, based on the plurality of final weights, a plurality of HT infected nodes; and
iv. an IP Piracy Detection module (400) comprising computer-readable instructions for execution by the processor comprising:
   A. accepting a first vectorized graph embedding from the Graph-to-Vector module (200);
   B. accepting a second vectorized graph embedding from the Graph-to-Vector module (200);
   C. calculating, based on the GNN (500), the second output comprising a similarity score of the first vectorized graph embedding and the second vectorized graph embedding; and
   D. determining based on the similarity score whether a second circuit corresponding to the second vectorized graph embedding contains IP piracy of the circuit corresponding to the first vectorized graph embedding.

2. The system of claim 1, wherein the plurality of base level files comprise register transfer level (RTL) files, gate-level netlist files, physical layout (GDSII) files, or a combination thereof.

3. The system of claim 1, wherein the graph is selected from a group comprising a control flow graph, a data flow graph, and an abstract syntax tree.

4. The system of claim 1, wherein parsing the combined base level file into a plurality of graphs comprises:
   a. parsing the combined base level file into an abstract syntax tree (AST); and
   b. generating the plurality of graphs from the AST.

5. The system of claim 1, wherein processing the plurality of embedded nodes through the pooling layers of the GNN (500) comprises top-k filtering.

6. The system of claim 1, wherein the Hardware Trojan Detection module (300) further comprises instructions for:
   a. removing the plurality of HT infected nodes from the combined graph; and
   b. recreating the plurality of base level files based on the combined graph with HT removed.

7. The system of claim 1, wherein calculating the similarity score comprises calculating a cosine similarity between the first vectorized graph embedding and the second vectorized graph embedding.

8. A method for detecting hardware Trojans (HT) and Intellectual Property (IP) piracy in a circuit, the circuit comprising a plurality of signals comprising input signals and output signals, based on a graph neural network (GNN) (500), the method comprising:
   a. reading code from a plurality of base level files from hardware;
   b. preprocessing the code from the plurality of base level files into a combined base level file;
   c. parsing the combined base level file into a plurality of graphs, wherein each graph of the plurality of graphs represents a signal from the plurality of signals such that the signal is a root node of the graph;
   d. combining the plurality of graphs into a combined graph, wherein the combined graph connects the output signals of the circuit to the input signals of the circuit with a root-to-leaf relationship;
   e. identifying any disconnected subgraphs and any redundant nodes in the combined graph;
   f. trimming the disconnected subgraphs and the redundant nodes from the combined graph;
   g. providing the GNN (500) comprising one or more graph convolutional neural network (GCN) layers, one or more pooling layers, and one or more multilayer perceptron (MLP) layers, wherein the GNN (500) is trained by a training set of hardware Trojan infected circuits and similar hardware designs mapped to embedding vectors in close proximity;
   h. applying the GNN (500) to the combined graph, wherein applying the GNN (500) comprises:
   i. extracting, for each node of the combined graph, an aggregated feature vector, wherein the aggregated feature vector comprises a plurality of features collected from any neighboring nodes of the node;
   ii. combining, for each node, a node feature vector of the node with the aggregated feature vector of the node to generate a node feature vector of any incoming neighbor nodes of the node;
   iii. calculating a weight for each node based on the GNN (500);
   iv. repeating steps i-iii for each GCN layer, wherein each repetition generates a node feature vector for each node, wherein a last repetition results in an embedded node and a final weight for each node;
   v. processing the plurality of embedded nodes through the pooling layers of the GNN (500) resulting in a pooled set of embedded nodes;
   vi. generating a vectorized graph embedding by combining, for each embedded node of the pooled set of embedded nodes, all node feature vectors; and
   vii. processing the vectorized graph embedding through the multilayer perceptron layers of the GNN (500) to reduce an overall output of the method to a first output and a second output;
   i. generating, based on the GNN (500), the first output of the vectorized graph embedding comprising a first two-dimensional value, wherein the first two-dimensional value comprises a probability of a HT in the circuit and a probability of no HT in the circuit;
   j. normalizing the first output;
   k. determining, if the first output has returned a greater probability of a HT, based on the plurality of final weights, a plurality of HT infected nodes;
   l. accepting a second vectorized graph embedding from the Graph-to-Vector module (200);
   m. calculating, based on the GNN (500), the second output comprising a similarity score of the first vectorized graph embedding and the second vectorized graph embedding; and
   n. determining based on the similarity score whether a second circuit corresponding to the second vectorized graph embedding contains IP piracy of the circuit corresponding to the first vectorized graph embedding.

9. The method of claim 8, wherein the plurality of base level files comprise register transfer level (RTL) files, gate-level netlist files, physical layout (GDSII) files, or a combination thereof.

10. The method of claim 8, wherein the graph is selected from a group comprising a control flow graph, a data flow graph, and an abstract syntax tree.

11. The method of claim 8, wherein parsing the combined base level file into a plurality of graphs comprises:
   a. parsing the combined base level file into an abstract syntax tree (AST); and
   b. generating the plurality of graphs from the AST.

12. The method of claim 8, wherein processing the plurality of embedded nodes through the pooling layers of the GNN (500) comprises top-k filtering.

13. The method of claim 8 further comprising:
   a. removing the plurality of HT infected nodes from the combined graph; and
   b. recreating the plurality of base level files based on the combined graph with HT removed.

14. The method of claim 8, wherein calculating the similarity score comprises calculating a cosine similarity between the first vectorized graph embedding and the second vectorized graph embedding.

15. A system for detecting hardware Trojans (HT) and Intellectual Property (IP) piracy in a circuit, the circuit comprising a plurality of signals comprising input signals and output signals, based on a graph neural network (GNN) (500), the system comprising:
   a. a processor capable of executing computer-readable instructions; and
   b. a memory component operatively connected to the processor comprising:
      i. a Hardware-to-Graph module (100) comprising computer-readable instructions for parsing a plurality of base level files into a plurality of graphs, wherein each graph of the plurality of graphs represents a signal from the plurality of signals such that the signal is a root node of the graph;
      ii. a Graph-to-Vector module (200) comprising:
         A. the GNN (500); and
         B. computer-readable instructions for accepting the graph from the Hardware-to-Graph module (100) and applying the GNN (500) to the combined graph, wherein applying the GNN (500) comprises generating a vectorized graph embedding from the graph and manipulating the vectorized graph embedding such that the vectorized graph embedding has a first output and a second output;
      iii. a Hardware Trojan Detection module (300) comprising computer-readable instructions for accepting the graph and the vectorized graph embedding from the Graph-to-Vector module (200) and determining, based on the first output, a plurality of HT infected nodes; and
      iv. an IP Piracy Detection module (400) comprising computer-readable instructions for comparing two vectorized graph embeddings from the Graph-to-Vector module (200) and determining based on a comparison between the two vectorized graph embeddings whether a second circuit corresponding to a second vectorized graph embedding contains IP piracy of the circuit corresponding to a first vectorized graph embedding.

16. The system of claim 15, wherein the plurality of base level files comprise register transfer level (RTL) files, gate-level netlist files, physical layout (GDSII) files, or a combination thereof.

17. The system of claim 15, wherein the graph is selected from a group comprising a control flow graph, a data flow graph, and an abstract syntax tree.

18. The system of claim 15, wherein parsing the combined base level file into a plurality of graphs comprises:
   a. parsing the combined base level file into an abstract syntax tree (AST); and
   b. generating the plurality of graphs from the AST.

19. The system of claim 15, wherein processing generating the vectorized graph embedding comprises top-k filtering.

20. The system of claim 15, wherein the Hardware Trojan Detection module (300) further comprises instructions for:
   a. removing the plurality of HT infected nodes from the graph; and
   b. recreating the plurality of base level files based on the graph with HT removed.

* * * * *